United States Patent
Huang et al.

(10) Patent No.: US 6,266,695 B1
(45) Date of Patent: Jul. 24, 2001

(54) TELECOMMUNICATIONS SWITCH MANAGEMENT SYSTEM

(75) Inventors: Peter Sung-An Huang; Dwight W. Doss, both of Richardson, TX (US)

(73) Assignee: Alcatel USA Sourcing, L.P., Plano, TX (US)

(*) Notice: Subject to any disclaimer, the term of this patent is extended or adjusted under 35 U.S.C. 154(b) by 0 days.

(21) Appl. No.: 08/997,342

(22) Filed: Dec. 23, 1997

(51) Int. Cl.$^7$ .................................................. G06F 15/173

(52) U.S. Cl. .......................... 709/223; 709/224; 709/226; 709/315

(58) Field of Search .................................. 709/223, 224, 709/225, 226, 315, 316

(56) References Cited

U.S. PATENT DOCUMENTS

| | | | |
|---|---|---|---|
| 5,696,697 | * 12/1997 | Blau et al. | 709/223 |
| 5,742,762 | * 4/1998 | Scholl et al. | 709/223 |
| 5,751,962 | * 5/1998 | Fanshier et al. | 709/223 |
| 5,802,291 | * 9/1998 | Balick et al. | 709/224 |
| 5,857,102 | * 1/1999 | McChesney et al. | |
| 5,933,601 | * 8/1999 | Fanshier et al. | 709/223 |
| 5,983,233 | * 11/1999 | Potonniee | |
| 5,999,179 | * 8/1999 | Kekic et al. | 345/349 |
| 6,012,152 | * 1/2000 | Douik et al. | |
| 6,018,625 | * 1/2000 | Hayball et al. | 709/315 |
| 6,020,889 | * 2/2000 | Tarbox et al. | 709/223 |
| 6,029,197 | * 2/2000 | Erimli et al. | 709/223 |

OTHER PUBLICATIONS

Barrett, D S; "Tools speed network–management setup"; Electronic Engineering Times; pp. 36, 51, Jun. 1996.*

Malamud C; DEC Networks and Architectures, McGraw–Hill; ISBN 0–07–039822–4; Chapter 9; pp. 241–275, 1989.*

Tang D; "Storage area networking"; Communications News; pp. 36, 39, May 1998.*

Voelcker, J; "Helping computers communicate"; IEEE Spectrum; pp. 61–70, Mar. 1986.*

* cited by examiner

Primary Examiner—Robert B. Harrell
Assistant Examiner—William C. Vaughn, Jr.
(74) Attorney, Agent, or Firm—Baker Botts L.L.P.

(57) ABSTRACT

A telecommunications switch management system which contains a system manager building block in communication with a remote computer. The system manager building block is also in communication with a system management interface building block, which contains a command interpreter building block and a system command interface building block. The command interpreter building block is in communication with the system manager building block and the system command interface building block. The system command interface building block contains at least one client building block. The client building blocks located in the system command interface building block are each in communication with a corresponding server building block, each of which in turn is in communication with the telecommunications switching system. The system manager building block provides communication between the remote computer and the system management interface building block. The system management interface building block provides communication between the system manager building block and the one or more servers which are in communication with the telecommunications switching system.

17 Claims, 13 Drawing Sheets

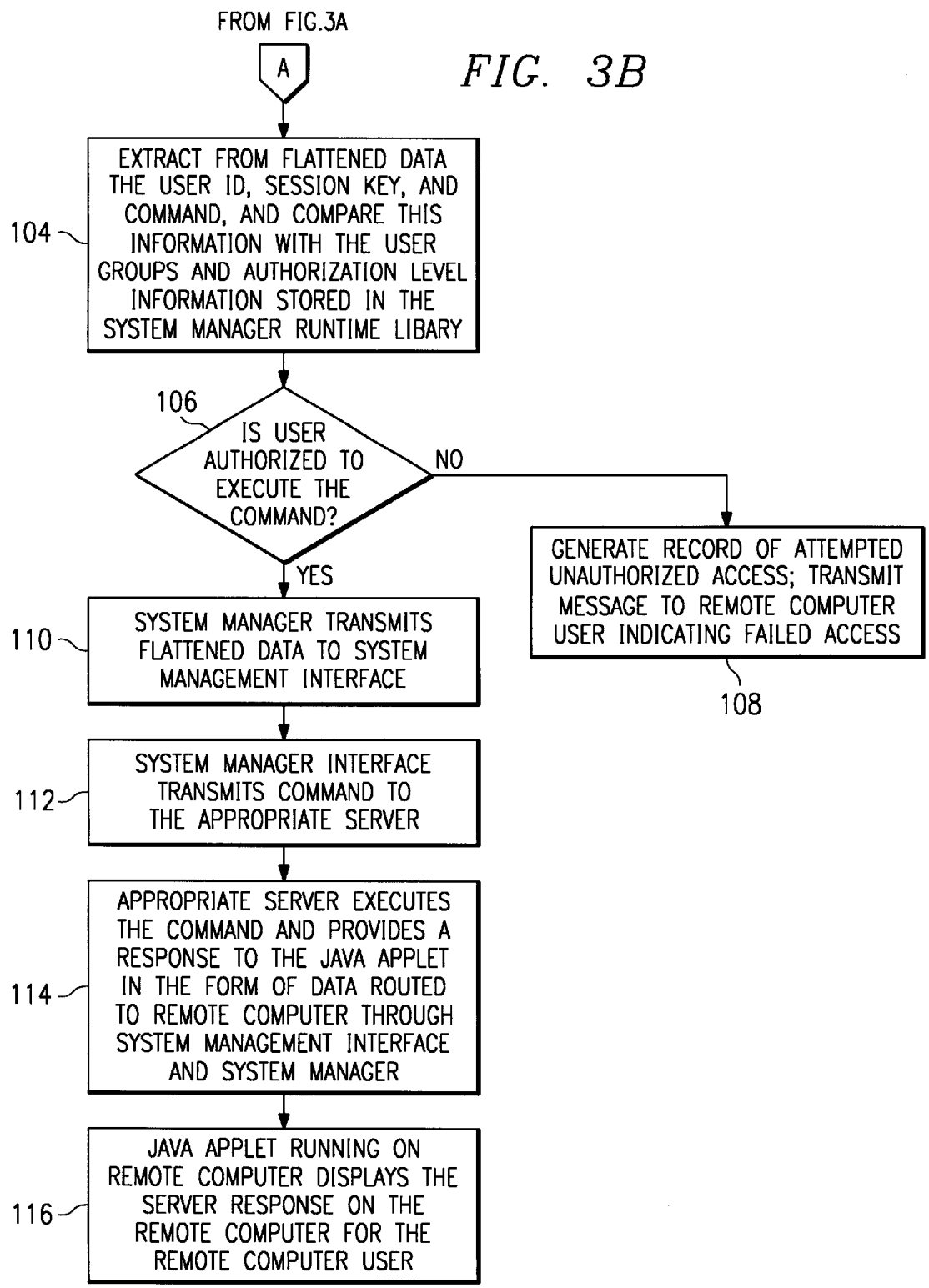

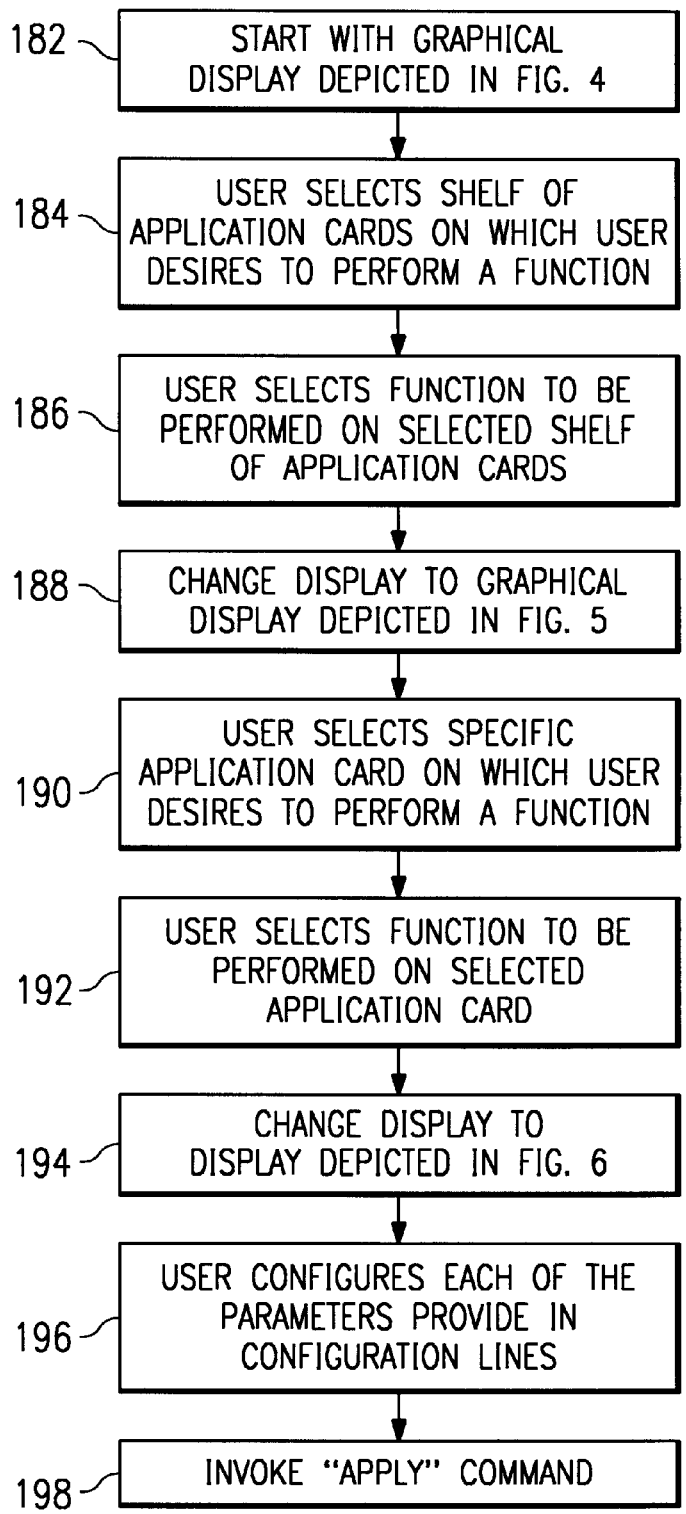

TELECOMMUNICATIONS SWITCH MANAGEMENT SYSTEM

TECHNICAL FIELD OF THE INVENTION

The present invention relates in general to the field of telecommunications switching systems. More particularly, the present invention is related to a Telecommunications Switch Management System for use with telecommunications switching systems.

BACKGROUND OF THE INVENTION

Conventional telecommunications switching systems employ centralized switching facilities which result in undesirable lengthy switching paths. Therefore, it is desirable to implement distributed telecommunications switching systems which do not require centralized switching facilities. However, elaborate management systems normally are required in order to provide users and operators with the ability to control, configure and monitor the various switches and other components which make up a typical distributed telecommunications switching system For example, an operator or user must be able to control, configure and monitor a distributed switching system's individual application cards, as well as the communication busses which interconnect those application cards Conventional distributed telecommunications switching systems use dedicated Operational Support Systems ("OSSs") and relatively complex and cryptic command-driven user interface systems in order to provide users with the ability to control, configure and monitor distributed switching systems. These dedicated OSSs are cumbersome to develop, maintain, upgrade and expand upon. Additionally, the command-driven user interfaces are relatively cryptic, cumbersome, non-intuitive and difficult for users to learn and use.

The dedicated OSSs which provide management and support functions for telecommunications switching systems are relatively inflexible and difficult to develop, maintain, upgrade and expand because they normally use dedicated architectures, rather than more desirable and flexible open architectures Additionally, the architectures for these dedicated OSSs normally are unsuitable for interfacing with standardized communications links such as intranets or the internet. Therefore, a need has arisen for a telecommunications switch management and support system which will provide increased flexibility, upgradability, expandability, and ease of development and maintenance.

SUMMARY OF THE INVENTION

In accordance with the present invention, a telecommunications switch management system is provided which substantially eliminates or reduces the disadvantages and problems associated with prior management systems for distributed telecommunications switching systems The telecommunications switch management system of the present invention is flexible and relatively easy to develop, maintain, upgrade and expand. Additionally, the telecommunications switch management system can interface with standardized communications links such as the Internet. The telecommunications switch management system of the present invention enables one or more users to remotely access the telecommunications switching system for any desired purpose, such as to monitor, control or reconfigure the telecommunications switching system.

The telecommunications switch management system of the present invention contains a system manager building block in communication with a remote computer. The system manager building block is also in communication with a system management interface building block, which contains a command interpreter building block and a system command interface building block. The command interpreter building block is in communication with the system manager building block and the system command interface building block. The system command interface building block contains at least one client building block. The client building blocks located in the system command interface building block are each in communication with a corresponding server building block, each of which in turn is in communication with the telecommunications switching system. The system manager building block provides communication between the remote computer and the system management interface building block. The system management interface building block provides communication between the system manager building block and the one or more servers which are in communication with the telecommunications switching system.

In another aspect of the invention, the client building blocks and server building blocks can include a system security manager client building block in communication with a system security manager server building block for providing the telecommunications switching system with various security functions. In still another aspect of the invention, the client building blocks and server building blocks can include a bearer manager client building block in communication with a bearer manager server building block for providing users with the ability to perform various management and monitoring functions on the telecommunications switching system. In yet another aspect of the invention, the client building blocks and server building blocks can include a fault manager client building block in communication with a fault manager server building block for providing users with the ability to review various types of faults which have occurred in the telecommunications switching system. In another aspect of the invention, the client building blocks and server building blocks can include a test manager client building block in communication with a test manager server building block for providing users with the ability to perform various tests on the telecommunications switching system. In still another aspect of the invention, the client building blocks and server building blocks can include a performance manager client building block in communication with a performance manager server building block for providing users with the ability to review the performance of the telecommunications switching system. In yet another aspect of the invention, the client building blocks and server building blocks can include a configuration management client building block in communication with a configuration management server building block for providing users with the ability to configure the various attributes of the telecommunications switching system.

In another aspect of the invention, the remote computer communicates with the system manager building block using the Internet inter-ORB (Object Request Broker) protocol ("IIOP") or the Hypertext Transport Protocol ("HTTP"). In still another aspect of the invention, the various building blocks of the telecommunications switch management system can communicate with one another by sending and receiving messages In yet another aspect of the invention, the various building blocks of the telecommunications switch management system can be designed using the well-known Common Object Request Broker Architecture ("CORBA"), and can communicate with one another using the CORBA communications protocol.

A technical advantage of the telecommunications switch management system of the present invention is its ability to provide multiple users remote access to telecommunications switching systems, for all of the same purposes as would be available using a dedicated terminal located proximate to the telecommunications switching system. Another technical advantage of the telecommunications switch management system of the present invention is its design flexibility and the relative ease with which it can be developed, maintained, upgraded and expanded. Still another technical advantage of the telecommunications switch management system of the present invention is its ability to interface with standardized communications links such as the Internet, and to use standardized CORBA architectures and communications protocols.

BRIEF DESCRIPTION OF THE DRAWINGS

For a more complete understanding of the present invention and the advantages thereof, reference is now made to the following description taken in conjunction with the accompanying drawings in which like references indicate like features and wherein:

FIGS. 3A–B are exemplary process flow diagrams for the operation of the Full Group Privileges Access Mechanism of the present invention.

FIG. 7 is an exemplary process flow diagram for the operation of the Graphical Shelf Navigator of the present invention.

DETAILED DESCRIPTION OF THE INVENTION

Figure 14:
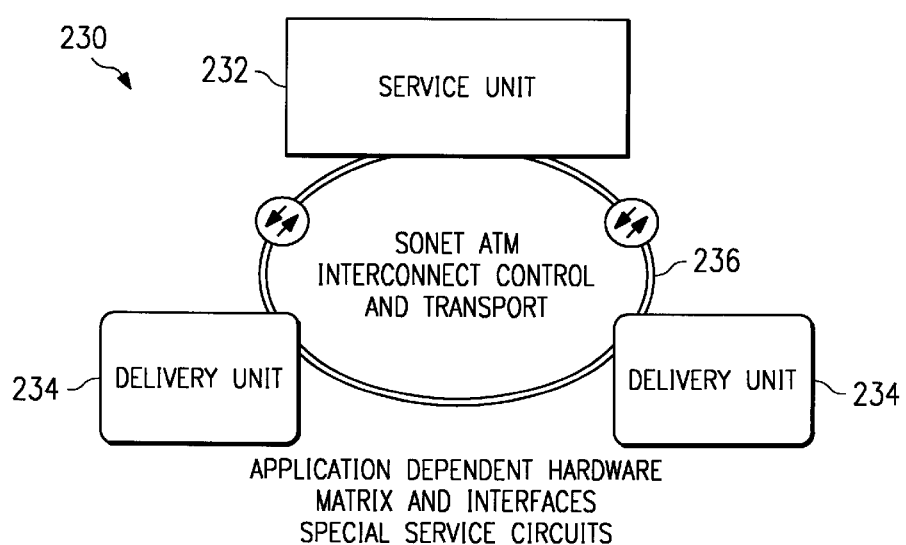
FIG. 14 is a high-level block diagram of a distributed telecommunications switching system which utilizes the telecommunications switch management system of the present invention.

FIG. 14 depicts a block diagram of a distributed Telecommunications Switching System 230 which utilizes the present invention. The distributed Telecommunications Switching System 230 includes a Service Unit Subsystem 232 which provides control and management on an advanced intelligent network ("AIN") service platform using information network architecture ("INA") software design principles. Distributed Telecommunications Switching System 230 also includes a plurality of Delivery Unit Subsystems 234 that provide the message transport mechanism for call information under the control and direction of Service Unit Subsystem 232. Service Unit Subsystem 232 and Delivery Unit Subsystems 234 communicate with one another through a Fiber Optic Ring 236. Call information is transported between the multiple Delivery Unit Subsystems 234, and between each Delivery Unit Subsystem 234 and Service Unit Subsystem 232 on Fiber Optic Ring 236, preferably in asynchronous transfer mode ("ATM") cell format The Service Unit Subsystem 232 provides the control and management functions for the distributed Telecommunications Switching System 230, and is separated from the transport mechanism function of Delivery Unit Subsystems 234. This separation of functionality between the Service Unit Subsystem 232 and the Delivery Unit Subsystems 234 allows each subsystem to evolve and be upgraded independently, in order to support new services or new technologies for enhancements to either subsystem. The Service Unit Subsystem 232 can be constructed to support multiple types of Delivery Unit Subsystems 234 which can provide multiple services including broadband, video, conventional telephone, and personal communications services to consumers on the public telephony network Service Unit Subsystem 232 and Delivery Unit Subsystems 234 of the distributed Telecommunications Switching System 230 may either be grouped within a single geographic area or may be geographically disbursed in several remote areas while maintaining the same distributed nature of the switching function to be performed The centralized control and management provided by Service Unit Subsystem 232 allows a user to be connected to different Delivery Unit Subsystems 234 while maintaining a common directory number Delivery Unit Subsystem 234 provides the switching fabric for distributed Telecommunications Switching System 230. Delivery Unit Subsystems 234 may be dedicated to a specific type of service or may accommodate multiple services.

The Fiber Optic Ring 236 allows the communication of service control, user traffic transport (including video, data, image and voice) and operations, administration, maintenance and provisioning ("OAM&P"). Fiber Optic Ring 236 provides quality information transmission and dual physical path transmission capability between the Service Unit Subsystem 232 and Delivery Unit Subsystems 234. Information may be transmitted between subsystems along one portion of the Fiber Optic Ring 236, leaving the other portions of the Fiber Optic Ring 236 available for simultaneous transmissions between other subsystems within the distributed Telecommunication Switching System 230. Additionally, distributed Telecommunications Switching System 230 can dynamically allocate and reallocate bandwidths for Fiber Optic Ring 236 transmission in order to accommodate periods of increased information demand.

Other features of distributed Telecommunications Switching System 230 include, but are not limited to, industry-standard operating systems, object-oriented development methodology, C++ implementation language, location-transparent interfaces using CORBA (Common Object Request Broker Architecture), a name-based messaging system, a well-defined OAM&P architecture, management interfaces, and encapsulation and intelligence. These and other features of distributed Telecommunications Switching System 230 are further described in U.S. Pat. No. 5,495,484, which is hereby incorporated by reference. CORBA is fully described in "The Common Object Request Broker: Architecture and Specification," which is published by the Object Management Group and X Open, and which is hereby incorporated by reference.

Figure 1:
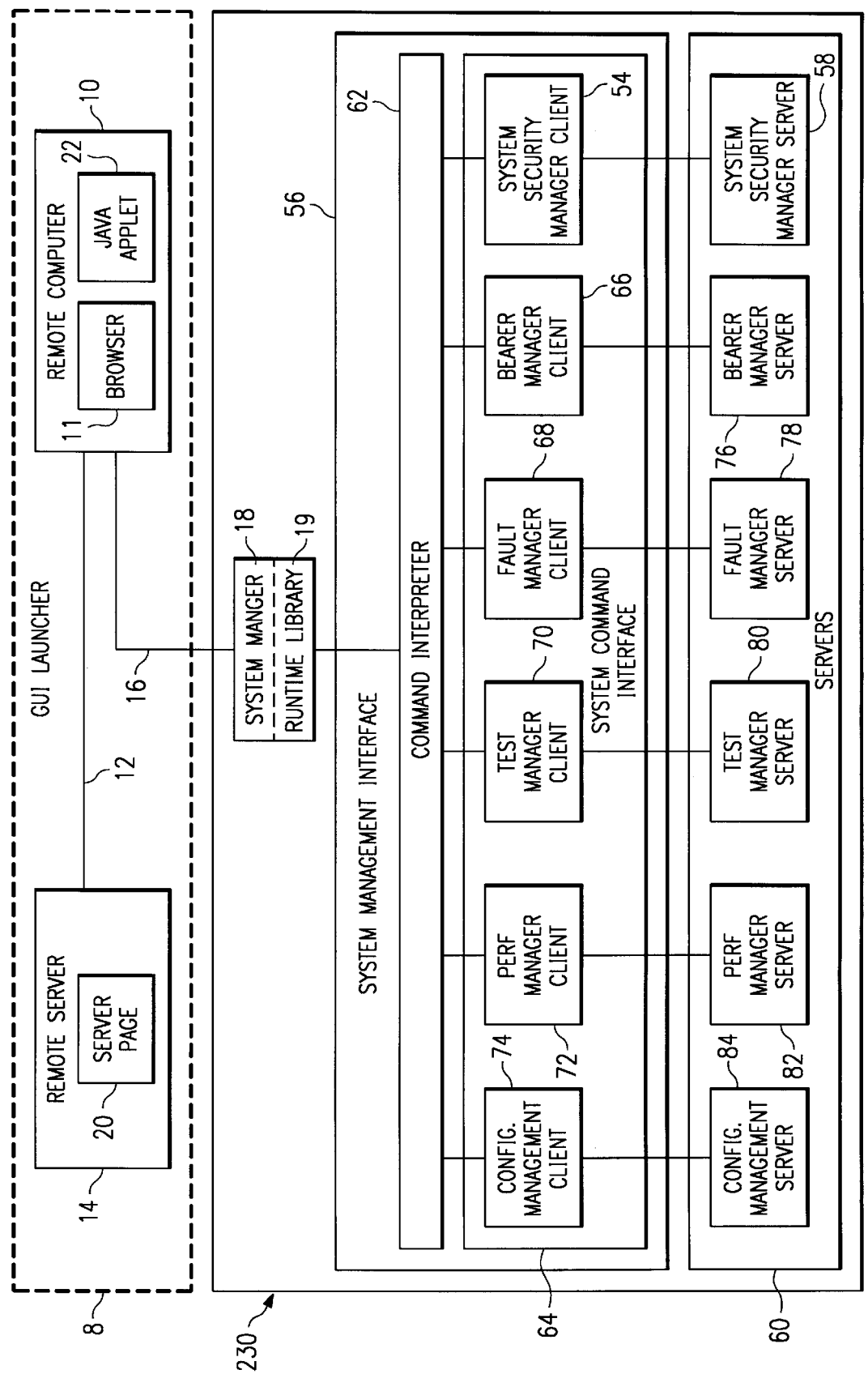
FIG. 1 is a high-level block diagram of the telecommunications switch management system of the present invention

The present invention provides a Telecommunications Switch Management System for operation with distributed Telecommunications Switching System 230. FIG. 1 depicts a high-level block diagram of the Telecommunications Switch Management System of the present invention, including the various software building blocks which comprise the Telecommunications Switch Management System of the present invention. A building block is defined to be one or more software objects and routines which can be deployed, upgraded and maintained in a software repository, and which also can be used by applications, either alone or in combination, in order to perform specific functions or operations. Additionally, building blocks normally have message interfaces. FIG. 1 depicts the following building blocks of the Telecommunications Switch Management System of the present inventions each of which will be discussed below in additional detail System Manager 18, System Security Manager Client 54, System Management Interface 56, System Security Manager Server 58, Command Interpreter 62, System Command Interface 64, Bearer Manager Client 66, Fault Manager Client 68, Test Manager Client 70, Performance Manager Client 72, Configuration Management Client 74, Bearer Manager Server 76, Fault Manager Server 78, Test Manager Server 80, Performance Manager Server 82, and Configuration Management Server 84

The Telecommunications Switch Management System of the present invention preferably includes a Graphic User Interface (GUI) Launcher 8 for the Telecommunications Switch Management System. GUI Launcher 8 includes Remote Computer 10, communications link 12, Remote Server 14, communications link 16, and System Manager 18. Remote Computer 10 in turn contains Browser software 11. System Manager 18 in turn contains Runtime Library software 19. Remote Computer 10 serves as a GUI Browser and communicates via communications link 12 with Remote Server 14, and also via communications link 16 with System Manager 18, as will be further described.

Browser 11 can be any type of system capable of accessing telecommunications link 12 Server Page 20 resides on Remote Server 14 and contains the application program necessary to enable Remote Computer 10 to communicate with the Telecommunications Switching System 230. A user at Remote Computer 10 initiates a system access session by establishing communication over link 12 with Remote Server 14. In response, Remote Server 14 downloads the application program to Remote Computer 10, which enables Remote Computer 10 to communicate with Telecommunications Switching System 230. Although this application program generally may be of any type, it typically is in the form of a Java Applet 22. Once Java Applet 22 has been loaded into Remote Computer 10, Remote Computer 10 can communicate in a stand-alone capacity with the Telecommunications Switching System 230 through communications link 16 and System Manager 18. Thus, once Java Applet 22 has been loaded into Manufacture and Sale of Tubes for Pneumatic Tires for Vehicle WheelsRemote Computer 10, Remote Computer 10 can communicate with the Telecommunications Switching System 230 without the need for any further communication with Remote Server 14.

The arrangement of GUI Launcher 8 enables one or more authorized users to access the Telecommunications Switching System 230 from any location having a remote computer system. Thus, authorized users located anywhere can access the Telecommunications Switching System 230 for all of the same purposes as could a user of a dedicated terminal located proximate to the Telecommunications Switching System 230. These purposes include, for example, the test and reconfiguration of the Telecommunications Switching System 230, as well as the monitoring of the Telecommunications Switching System's performance, faults and security system.

Although Remote Server 14 generally can be located anywhere, as depicted in FIG. 1, Remote Server 14 may for example be configured to be included within System Manager 18. In such a case where Remote Server 14 is included within System Manager 18, Remote Computer 10 would communicate with System Manager 18, and also with Remote Server 14 contained therein, via communications link 16. Communications link 12 therefore would not be required if Remote Server 14 were included within System Manager 18.

Although Remote Computer 10 can be any type of computer system, it may comprise for example an ftSparc (fault-tolerant Sparc) workstation, which comprises a Sun Workstation and UNIX Solaris Operating System, or a personal computer (PC), including a portable PC such as a laptop computer. Similarly, although Remote Server 14 may be any type of servers it may comprise an HTML (Hypertext Markup Language) Server, for example. Additionally, Server Page 20 may for example comprise an HTML Page. Communication links 12 and 16 may be of any type, but may comprise for example an Incranet communications link or a telephone modem in combination with a standard Internet telephone line communications link. In the event that telecommunications link 12 is a standard Internet telephone line, Browser 11 may be any Web Browser, such as NETSCAPE or MICROSOFT's INTERNET EXPLORER, for example. The communications protocol used by communications links 12 and 16 may comprise the IIOP (Internet Inter-ORB (Object Request Broker) Protocol)) or HTTP (Hypertext Transport Protocol) protocols, for example. Although System Manager 18 can be any type of message passing and handling system, it may for example comprise a Message Object Stream System (MOSS)

Figure 2:
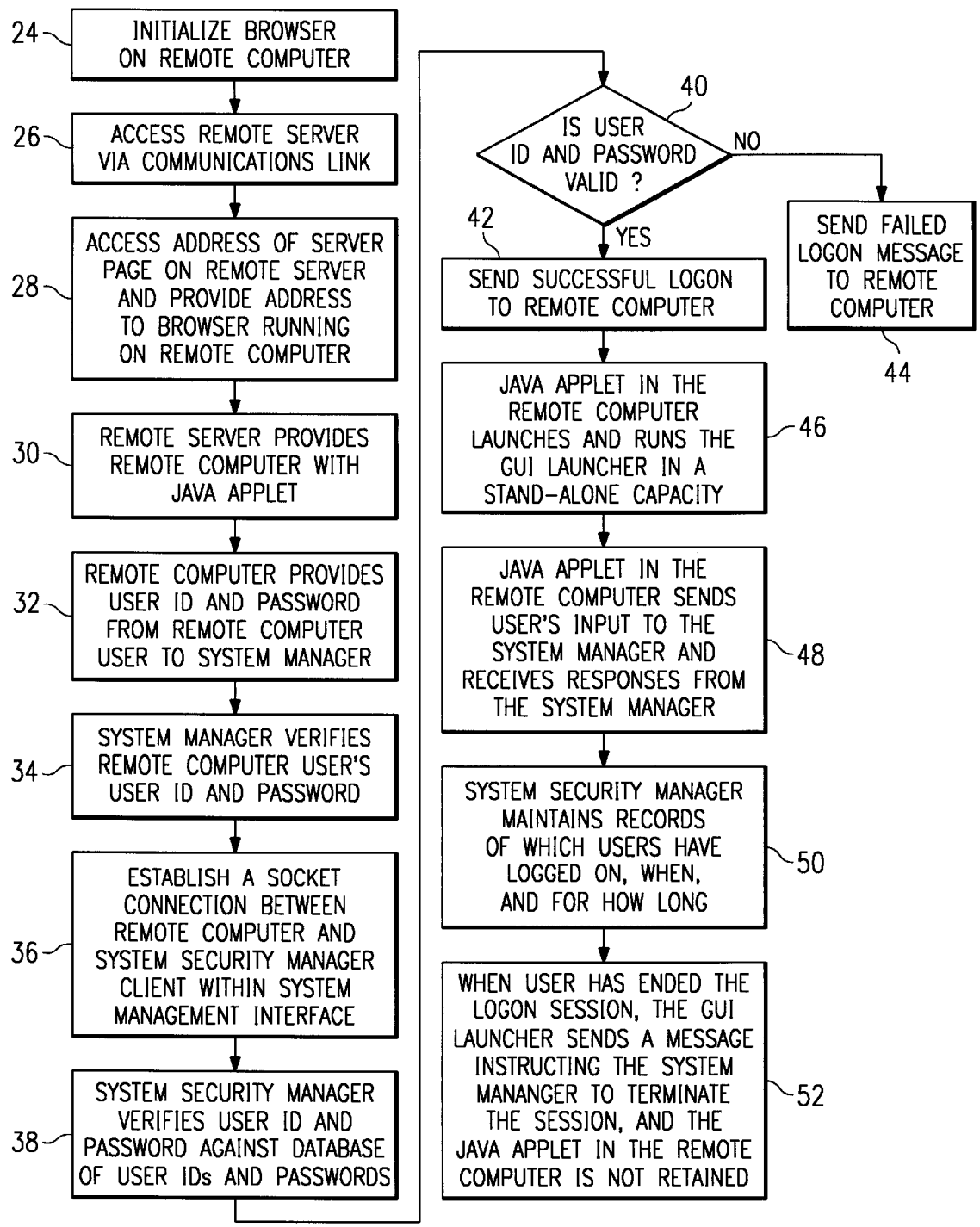
FIG. 2 is an exemplary process flow diagram for the operation of the GUI Launcher of the present invention.

FIG. 2 depicts an exemplary process flow for the operation of GUI Launcher 8 beginning with Block 24. In order to use GUI Launcher 8 to access the Telecommunications Switching System 230, a user at Remote Computer 10 initializes Browser 11 to access telecommunications link 12, as shown in Block 24. As shown in Block 26, Browser 11 then accesses Remote Server 14 via communications link 12. In Block 28, Remote Computer 10 in combination with Browser 11 access the address of Server Page 20 which is located on Remote Server 14. Remote Server 14 then provides the address of Server Page 20 to Browser 11 running on Remote Computer 10 As shown in Block 30, Remote Server 14 then provides Remote Computer 10 with the application program necessary to enable Remote Computer 10 to communicate with the Telecommunications Switching System 230. Typically, this application program is provided to Remote Computer 10 in the form of Java Applet 22.

In Block 32, Remote Computer 10 in conjunction with Java Applet 22 provide the Remote Computer user's User Identification (ID) and password to System Manager 18 via communications link 16. System Manager 18 contains Runtime Library 19, in which is maintained a database of authorized User IDs and passwords. Using its Runtime Library 19, System Manager 18 verifies the Remote Computer user's User ID and password, as shown in Block 34. As shown in Block 36, assuming the User ID and password are both valid, System Manager 18 establishes a socket connection between Remote Computer 10 and System Security Manager Client 54 within System Management Interface 56, depicted in FIG. 1. Although System Manager 18 and System Management Interface 56 may be designed using any suitable software architecture, they may for example be designed using the well known CORBA architecture System Security Manager Client 54, in conjunction with System Security Manager Server 58 which is part of Servers 60, verifies the Remote Computer user's ID and Password against a database of User IDs and Passwords, as shown in Block 38. As shown in Blocks 40 and 42, if the user's User ID and Password are valid, System Security Manager Client 54 sends a message to Remote Computer 10 indicating a successful logon. If on the other hand, either the user's User ID or Password is invalid, System Security Manager Client 54 sends a message to Remote Computer 10 indicating that the logon attempt has failed, as shown in Blocks 40 and 44. System Management Interface 56, System Security Manager Client 54 and System Security Manager Server 58 will each be described in further detail below.

In Block 46, once a successful logon has been established, Java Applet 22 in Remote Computer 10 launches and runs the GUI Launcher so that the Remote Computer user can access and control the Telecommunications Switching System 230 from Remote Computer 10. As described previously, Remote Computer 10 in conjunction with Java Applet 22 operate in a stand-alone capacity without the need for additional communication between Remote Computer 10 and Remote Server 14. While the GUI Launcher is running, Remote Computer 10 in conjunction with Java Applet 22 send messages representative of the Remote Computer user's input to System Manager 18, and also receive from System Manager 18 messages relating to the Telecommunications Switching System 230, as shown in Block 48. Additionally, in Block 50, System Security Manager Client 54 in conjunction with System Security Manager Server 58 maintain records regarding which Users have logged on, as well as when and for how long they each have logged on.

When the user of Remote Computer 10 wishes to terminate the logon session, the user enters the appropriate command at Remote Computer 10, and the GUI Launcher sends a message instructing System Manager 18 to terminate the session, as shown in Block 52. When the logon session has been terminated, Remote Computer 10 does not retain Java Applet 22. Rather, for the next logon session from Remote Computer 10, Remote Server 14 again provides to Remote Computer 10, typically in the form of a Java Applet 22, the application program which enables Remote Computer 10 to communicate with the Telecommunications Switching System 230. This eliminates the need to install and maintain multiple copies of the necessary application program on one or more Remote Computers 10. Instead, the necessary application program need only be installed, maintained and updated on Remote Server 14.

Figure 11:
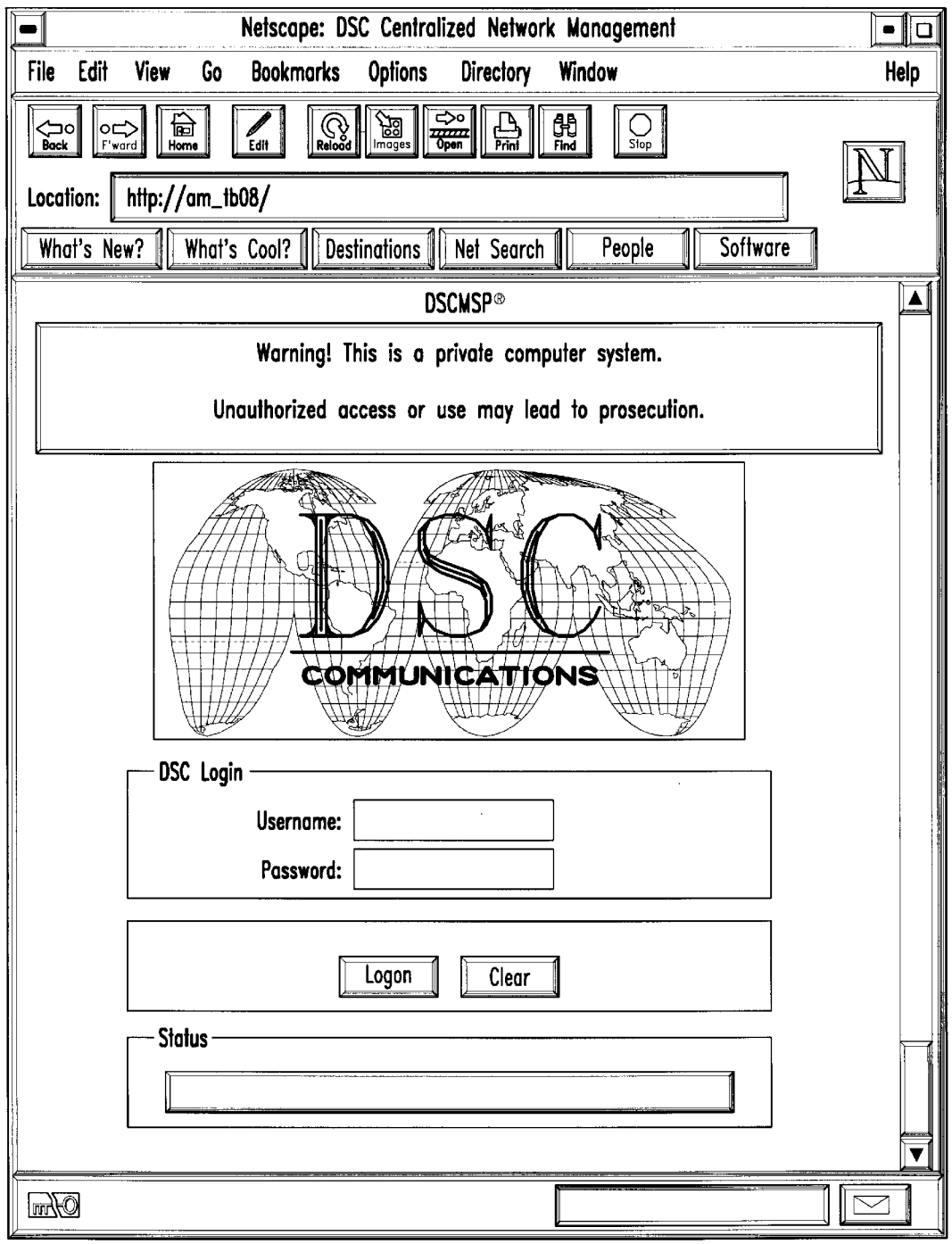
FIG. 11 is an exemplary Login Screen provided by the GUI Launcher of the present invention.
Figure 12:
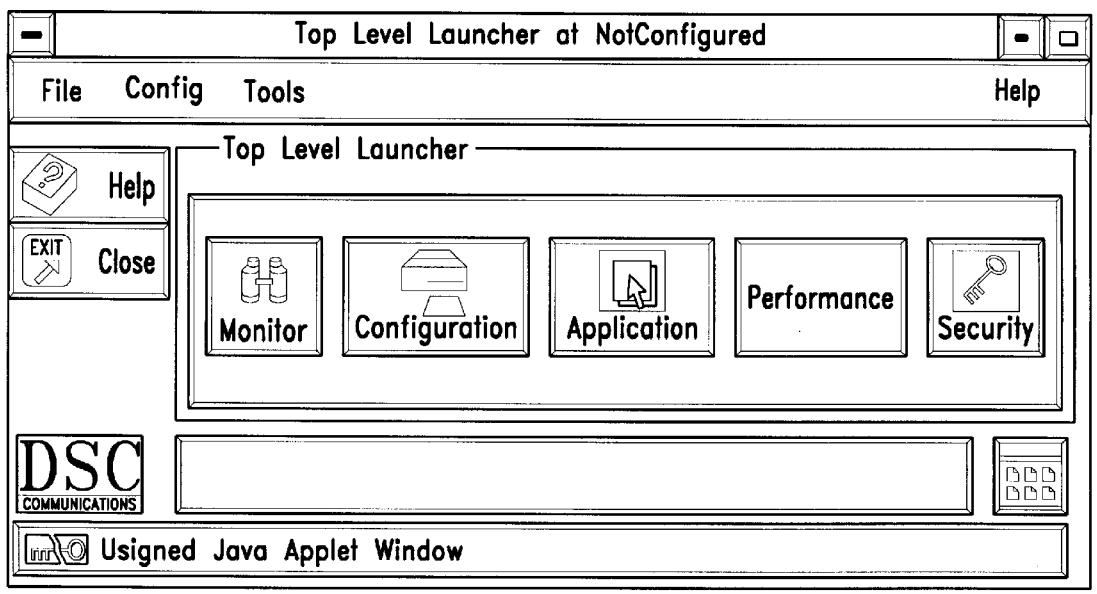
FIG. 12 is an exemplary top-level display screen provided by the GUI Launcher of the present invention
Figure 13:
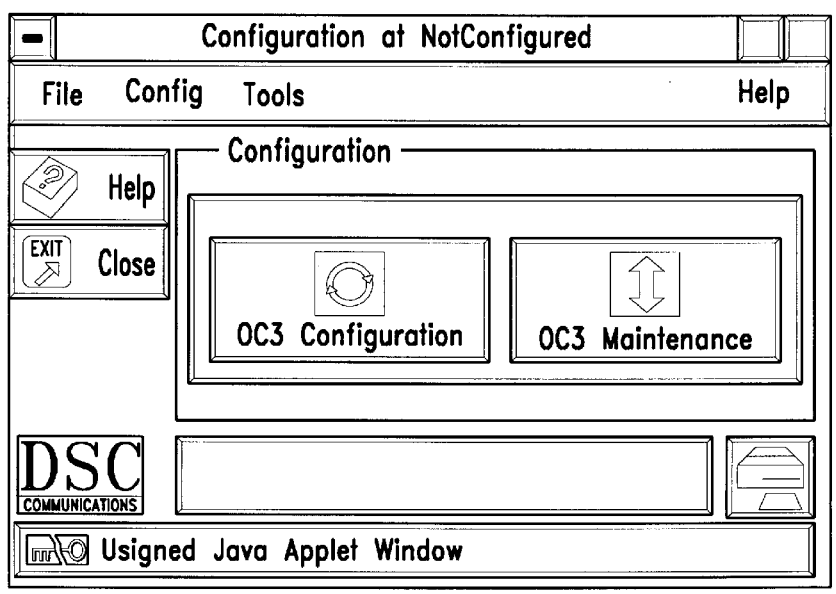
FIG. 13 is an exemplary next-level display screen provided by the GUI Launcher of the present invention.

FIGS. 11–13 depict exemplary displays provided by GUI Launcher 8 for enabling a user to access the Telecommunications Switch Management System of the present invention. FIG. 11 depicts an exemplary Login Screen which prompts the user to enter a User ID and password The GUI Launcher 8 will not permit the user to continue to the next GUI Launcher display unless the user enters a valid User ID and password FIG. 12 depicts an exemplary top-level display provided by GUI Launcher 8p which would be generated if the user enters a valid User ID and password in the Login Screen depicted in FIG. 11 This top-level display provides the user with the first layer of selections regarding the type of access the user is seeking into the Telecommunications Switch Management System and the accompanying Telecommunications Switching System 230. In the example depicted in FIG. 12! the user can select from the GUI Launcher 8 options designated as "Monitor", "Configuration", "Applications", "Performance", and "Security". Other selections may also be provided instead of, or in addition to, the exemplary selections depicted in FIG. 12.

FIG. 13 depicts an exemplary next-level display provided by GUI Launcher 8 The GUI Launcher 8 would generate the exemplary display depicted in FIG. 13 if the user selects the option designated as "Configuration" in the display depicted in FIG. 12. In the example depicted in FIG. 13, the user can select from options designated as "OC3 Configuration" and "OC3 Maintenance". These exemplary selections could for example provide the user access to the Graphical Shelf Navigator, which is discussed in additional detail below. Other selections may also be provided in addition to or instead of the exemplary selections depicted in FIG. 13.

In addition to GUI Launcher 8, the system of FIG. 1 provides additional unique elements of the Telecommunications Switch Management System configured in a unique architecture so as to provide capabilities and flexibility not available in systems of the prior art. FIG. 1 depicts these additional elements and the architecture of the Telecommunications Switch Management System for operation with the Telecommunications Switching System 230. In particulars FIG. 1 depicts System Management Interface 56 which comprises Command Interpreter 62 and System Command. Interface 64. System Management Interface 56 communicates with Servers 60 in order to provide communication with the Telecommunications Switching System 230. System Command Interface 64 comprises multiple Clients, namely System Security Manager Client 54, Bearer Manager Client 66, Fault Manager Client 68, Test Manager Client 70, Performance Manager Client 72 and Configuration Management Client 74. Servers 60 comprise multiple Servers, namely System Security Manager Server 58, Bearer Manager Server 76, Fault Manager Server 78, Test Manager Server 80, Performance Manager Server 82 and Configuration Management Server 84. Each Server communicates with a corresponding Client, as depicted in FIG. 1.

System Management Interface 56 and Servers 60, in conjunction with GUI Launcher 8, permit users to access and communicate with the Telecommunications Switching System 230 for purposes such as the test and reconfiguration of the Telecommunications Switching System 230, as well as the monitoring of Telecommunications Switching System 230's performance, faults and security system. Users may use Remote Computer 10 to send commands and messages to the Telecommunications Switching System 230, as well as to receive commands and messages therefrom.

Commands and Messages can be sent and received between Remote Computer 10 and System Manager 18 via communications link 16. Additionally, System Manager 18 can communicate with Command Interpreter 62 within System Management Interface 56. System Manager 18 processes commands and messages being sent by Remote Computer 10 to be compatible with, and suitable for receipt by, Command Interpreter 62, and also processes commands and messages being sent by Command Interpreter 62 to be compatible with, and suitable for receipt by, Remote Computer 10. Although communications link 16 may use any appropriate communications protocol, the protocol may comprise the IIOP or HTTP protocols, for example. Additionally, although System Manager 18 and Command Interpreter 62 may be designed using any suitable software architecture, they may for example be designed using the well known CORBA architecture. In such a case where System Manager 18 and Command Interpreter 62 are designed using the CORBA architecture, System Manager 18 and Command Interpreter 62 would communicate with one another using CORBA communications protocol.

System Management Interface 56 serves to determine, for each message and command sent by Remote Computer 10 via System Manager 18, which client located in System Command Interface 64 and which corresponding Server 60 must be requested in order to implement that message or command. Command Interpreter 62, located within System Management Interface 56, interprets all messages and commands received from Remote Computer 10 via System Manager 18, before forwarding the message or command on to System Command Interface 64. System Command Interface 64, in conjunction with System Security Manager Client 54 and System Security Manager Server 58, then determines whether the user of Remote Computer 10 is authorized to implement the function or command received from Remote Computer 10 via System Manager 18. The security-related functions of System Security Manager Client 54 and System Security Manager Server 58 will be discussed below in additional detail Command Interpreter 62 can communicate with System Command Interface 64, and with Clients 54, 66, 68, 70, 72 and 74 therein. Command Interpreter 62 processes commands and messages being sent by System Manager 18 of GUI Launcher 8 to be compatible with, and suitable for receipt by, System Command Interface 64, and also processes commands and messages being sent by System Command Interface 64 to be compatible with, and suitable for receipt by, System Manager 18 Although any appropriate communications protocol may be used for communication between Command Interpreter 62 and System Command Interface 64, the protocol may comprise the Library Application Programming Interface (API) protocol, for example.

System Command Interface 64, and Clients 54, 66, 68, 70, 72 and 74 therein, can communicate with Servers 60. Each Client in System Command Interface 64 communicates with a corresponding Server in Servers 60. More specifically, System Security Manager Client 54, Bearer Manager Client 66, Fault Manager Client 68, Test Manager Client 70, Performance Manager Client 72 and Configuration Management Client 74 communicate with System Security Manager Server 58, Bearer Manager Server 76, Fault Manager Server 78, Test Manager Server 80, Performance Manager Server 82 and Configuration Management Server 84, respectively. System Command Interface 64 processes commands and messages being sent by Command Interpreter 62 to be compatible with, and suitable for receipt by, Servers 60, and also processes commands and messages being sent by Servers 60 to be compatible with, and suitable for receipt by, Command Interpreter 62.

System Security Manager Client 54 in conjunction with System Security Manager Server 58 provide system security administration for the Telecommunications Switch Management System, and for the accompanying Telecommunications Switching System 230. These security-related functions will be discussed below in additional detail.

Bearer Manager Client 66 in conjunction with Bearer Manager Server 76 enable the user of Remote Computer 10 to perform various review, management and control functions regarding the status and configuration of Telecommunications Switching System 230. These functions include, but are not limited to, reviewing socket connections, performing bus management functions, and assigning available switching channels within Telecommunications Switching System 230.

Fault Manager Client 68, in conjunction with Fault Manager Server 78, enables the user of Remote Computer 10 to review the fault status of, and the historical fault statistics for, Telecommunications Switching System 230. Test Manager Client 70, in conjunction with Test Manager Server 80, enables the user of Remote Computer 10 to perform various tests on Telecommunications Switching System 230. Test Manager Client 70 in conjunction with Test Manager Server 80 first determine whether the requested test will disrupt the normal operation of Telecommunications Switching System 230. Test Manager Client 70 in conjunction with Test Manager Server 80 then have the requested test performed by the appropriate client located in System Command Interface 64 and the appropriate corresponding Server 60. Test Manager Client 70 in conjunction with Test Manager Server 80 next collate the results of the test performed, and return those results back to the user of Remote Computer 10 via System Management Interface 56 and System Manager 18.

Performance Manager Client 72, in conjunction with Performance Manager Server 82, enables the user of Remote Computer 10 to review various data regarding the performance of Telecommunications Switching System 230. Performance Manager Client 72, in conjunction with Performance Manager Server 82, also enables the user of Remote Computer 10 to modify or reset, or set the thresholds on, the various performance-monitoring data counters of Telecommunications Switching System 230.

Configuration Management Client 74, in conjunction with Configuration Management Server 84, enables the user of Remote Computer 10 to implement the creation, deletion, removal, restoration and modification of various attributes of the equipment and facilities of Telecommunications Switching System 230.

Although System Command Interface 64, and Clients 54, 66, 68, 70, 72 and 74 therein, and Servers 60 may be designed using any suitable software architecture, they may for example be designed using the well known CORBA architecture. In such a case where System Command Interface 64 and Servers 60 are designed using the CORBA architecture, System Command Interface 64 and Servers 60 would communicate with one another using CORBA communications protocol Additionally, the application programs of Servers 60 may be constructed using any suitable method, but may be constructed using the well known C++ object-oriented programming language, for example.

Messages and commands sent from Remote Computer 10 to System Manager 18, and then to Command Interpreter 62, System Command Interface 64 and Servers 60 may for example represent commands from the Remote Computer user for reconfiguring the Telecommunications Switching System 230, or queries from the Remote Computer user regarding the status of the Telecommunications Switching System 230. On the other hand, messages and commands sent from Servers 60 may for example represent messages regarding the status or configuration of the Telecommunications Switching System 230, or commands to be directed to Remote Computer 10 instructing the user regarding how to reconfigure or determine the status of the Telecommunications Switching System 230.

The present invention also provides a Full Group Privileges Access Mechanism which provides security administration and account administration for the Telecommunications Switch Management System and the accompanying Telecommunications Switching System 230. The Full Group Privileges Access Mechanism serves to ensure that only authorized users are able to access the Telecommunications Switch Management System and the Telecommunications Switching System 230. The Full Group Privileges Access Mechanism also serves to further ensure that, even if a particular user is generally authorized to access the system, the user cannot access any portion or function of the system which the user is not specifically authorized to access.

As depicted in FIG. 1, the Full Group Privileges Access Mechanism is provided by System Manager 18 and Runtime Library 19 in conjunction with System Security Manager Client 54, which is located in System Management Interface 56, and System Security Manager Server 58. The Full Group Privileges Access Mechanism maintains records of a variety of pertinent information in Runtime Library 19, in order to provide security and account administration for the system. Although records of any suitable information may be maintained, the Full Group Privileges Access Mechanism may for example maintain records regarding the list of authorized users, user groups, users' authorization levels, and the minimum authorization levels required for a user to execute each of the Telecommunications Switch Management System's available commands, or access each of the system's functions.

More specifically, the Full Group Privileges Access Mechanism may for example maintain records of (a) authorized User IDs; (b) the date and time each User ID expires and therefore becomes unauthorized; (c) authorized Passwords for each authorized User ID; (d) the date and time each Password expires and therefore becomes unauthorized; (e) the authorization level for each authorized User ID; (f) the User Group of which each user having an authorized User ID is a member; (g) the minimum authorization level required to execute each available command and access each available function; and (h) the User Group or Groups authorized to execute each available command and access each available function.

When a user attempts to access the Telecommunications Switch Management System, the Full Group Privileges Access Mechanism compares the user's User ID and Password against its records of authorized User IDs, the expiration date and time for each authorized User ID, authorized Passwords for each authorized User ID, and the expiration date and time for each authorized Password. The Full Group Privileges Access Mechanism will refuse the user access to the Telecommunications Switch Management System unless the user has a valid and unexpired User ID and Password. In the event that the Full Group Privileges Access Mechanism refuses to provide access to the Telecommunications Switch Management System, the Full Group Privileges Access Mechanism generates a record of the attempted unauthorized access, so that unauthorized activities may be recorded and subsequently investigated if necessary.

As discussed above, the Full Group Privileges Access Mechanism also maintains records of the authorization level which has been assigned to each authorized user and User ID. A user's authorization level determines which functions of the Telecommunications Switch Management System the user is authorized to access, and which commands the user is authorized to execute. Thus, each function and command provided by the Telecommunications Switch Management System has a minimum authorization level assigned to it. In order for a user to access a particular system function or execute a particular system command, there must be assigned to that user an authorization level at least as high in number as the authorization level assigned to that function or command In this way, a user having a relatively high authorization level, such as a system administrator for example, can be provided more privileges and greater access to functions and commands than would an ordinary type of user who may, for example, only need to determine the status of the Telecommunications Switching System 230.

Although there may be any number of different authorization levels, the Full Group Privileges Access Mechanism may be configured to provide 4, 16, 64 or 256 different authorization levels, for example. In a system configured for 16 different authorization levels (numbered 1 through 16), for example, a user having an authorization level of 6 would be able to access any function or execute any command having assigned to it an authorization level of 6 or lower. Similarly, a user having an authorization level of 1 would only be able to access functions or execute commands which have an authorization level of 1, whereas a user having an authorization level of 16 would be able to access all available functions and execute all available commands.

For the above-described example in which the Full Group Privileges Access Mechanism is configured to provide 16 different authorization levels, an exemplary list of several functions and commands, together with their respective assigned minimum authorization levels, is presented below in Table 1.

Manufacture and Sale of Tubes for Pneumatic Tires for vehicle Wheels

TABLE 1

| Function/Command | Minimum Authorization Level |
| --- | --- |
| Create | 14 |
| Change | 13 |
| Delete | 15 |
| Display | 6 |
| Administration Functions | 16 |

In this example, because functions and commands such as the exemplary Create, Change, Delete and Administration functions could potentially have a great effect on the Telecommunications Switch Management System and the associated Telecommunications Switching System 230, these functions and commands have been assigned the relatively high minimum authorization levels of 14, 13, 15 and 16, respectively. Thus, only users having authorization levels of 14 through 16 would be able to access the Create function; only users having authorization levels of 13 through 16 would be able to access the Change function; only users having authorization levels of 15 or 16 would be able to access the Delete function; and only users having an authorization level of 16 would be able to access the Administration Functions.

On the other hand, because the exemplary Display function would not affect the Telecommunications Switch Management System to the extent that the exemplary Create, Change, Delete and Administration functions would, the Display function has in this example been assigned the much lower minimum authorization level of 6. Thus, any users having authorization levels of 6 through 16 would be able to access and execute the Display function.

In addition to maintaining records of authorized User IDs, Passwords, expiration dates, users' authorization levels, and the minimum authorization level assigned to each function and command, the Full Group Privileges Access Mechanism also maintains records regarding User Groups, a list of authorized users assigned to each User Group, and a list of functions and commands which members of each User Group are authorized to access. User Groups are an additional mechanism by which the Full Group Privileges Access Mechanism provides security administration and account administration for the Telecommunications Switch Management System.

Each User Group comprises a list of authorized users which have been assigned to that User Group. It is possible for a particular user to be assigned to more than one User Group. In addition, each User Group has assigned to it a list of functions which members of that User Group are authorized to access, and a list of commands which members of that User Group are authorized to execute. Thus, in order for a particular user to access a particular function or execute a particular command of the Telecommunications Switch Management System, the user must be a member of one or more of the User Groups authorized to access that function or execute that command Although there may be any type and number of User Groups, an exemplary set of User Groups might include a Tester Group, Maintenance Group and Administrator Group. Each of these User Groups would have associated with it a set of functions which each member of the respective User Group would be entitled to access, and a set of commands which each member of the respective User Group would be entitled to execute. Using the same set of exemplary functions and commands presented in Table 1 above, an exemplary set of User Groups, together with the functions and commands which members of each User Group are entitled to access and execute, are presented below in Table 2. Manufacture and Sale of Tubes for Pneumatic Tires for Vehicle Wheels

TABLE 2

| | Function/Command Access | | | | |
|---|---|---|---|---|---|
| User Group | Create | Change | Delete | Display | Admin. Fcns. |
| Tester | No | No | No | Yes | No |
| Maintenance | Yes | Yes | No | Yes | No |
| Administrator | Yes | Yes | Yes | Yes | Yes |

In the example presented in Table 2, members of the Tester User Group have been authorized to access the Display function, but not the Create, Change, Delete or Administration functions; members of the Maintenance User Group have been authorized to access the Create, Change and Display functions, but not the Delete or Administration functions; and members of the Administrator User Group have been authorized to access each of the Create, Change, Delete, Display and Administration functions.

Thus, in the present example, an authorized user who is a member of the Administrator User Group would have access to a greater number of functions and commands than would members of the Maintenance and Tester User Groups, and members of the Maintenance User Group would have greater access to commands and functions than would members of the Tester User Group. As a general rule, relatively few User Groups would be provided access to functions and commands which might have a relatively large effect on the Telecommunications Switch Management System and the associated Telecommunications Switching System 230, such as the Delete and Administration functions On the other hand, a larger number of User Groups typically would be provided access to functions and commands which would have little or no effect on the system, such as the Display function.

Typically, a User Group, such as the Administrator User Group, would include only user members such as system administrators who would require relatively complete access to the functions and commands provided by the Telecommunications Switch Management System. Accordingly, the exemplary Administrator User Group would be provided access to most or all of the available functions and commands, as in the illustrative example provided in Table 2. On the other hand, a User Group, such as the Tester User Group, would include user members authorized to review the status and configuration of the system, but not authorized to alter or reconfigure the system. Accordingly, the Tester User Group would be provided access only to functions and commands which could have little or no impact on the system, such as the Display function.

As discussed above, in addition to maintaining records relating to the User Groups, the Full Group Privileges Access Mechanism also maintains records relating to the users' authorization levels and the minimum authorization level assigned to each function and command. In order to provide security administration for the Telecommunications Switch Management System, the Full Group Privileges Access Mechanism uses the records relating to the User Groups in combination with the records relating to authorization levels.

More specifically, in order for a user to access a particular function or execute a particular command of the Telecommunications Switch Management System, the Full Group Privileges Access Mechanism typically would require that the user both (a) be a member of a User Group authorized to access the desired function or execute the desired command, and (b) have an authorization level at least as high as the minimum authorization level assigned to the function or command. Although the Full Group Privileges Access Mechanism may also be configured to require only that (a) the user be a member of one of the User Groups authorized to access the desired function or execute the desired command, or (b) the user have an authorization level at least as high as the minimum authorization level assigned to the function or command, the Full Group Privileges Access Mechanism typically would be configured to require that a user meet both, rather than only one of, these two requirements. In providing security administration by using the records relating to the User Groups in combination with the records relating to authorization levels, the Full Group Privileges Access Mechanism can provide different access privileges to different users who are members of the same User Group.

In the event that a user attempts to access a function or execute a command which the user is not authorized to access or execute, the Full Group Privileges Access Mechanism prevents the user from accessing that function or executing that command Whenever the Full Group Privileges Access Mechanism refuses to permit a user to access a function or execute a command, the Full Group Privileges Access Mechanism generates a record of the attempted unauthorized access, so that unauthorized activities may be recorded and subsequently investigated, if necessary.

Figure 3A:
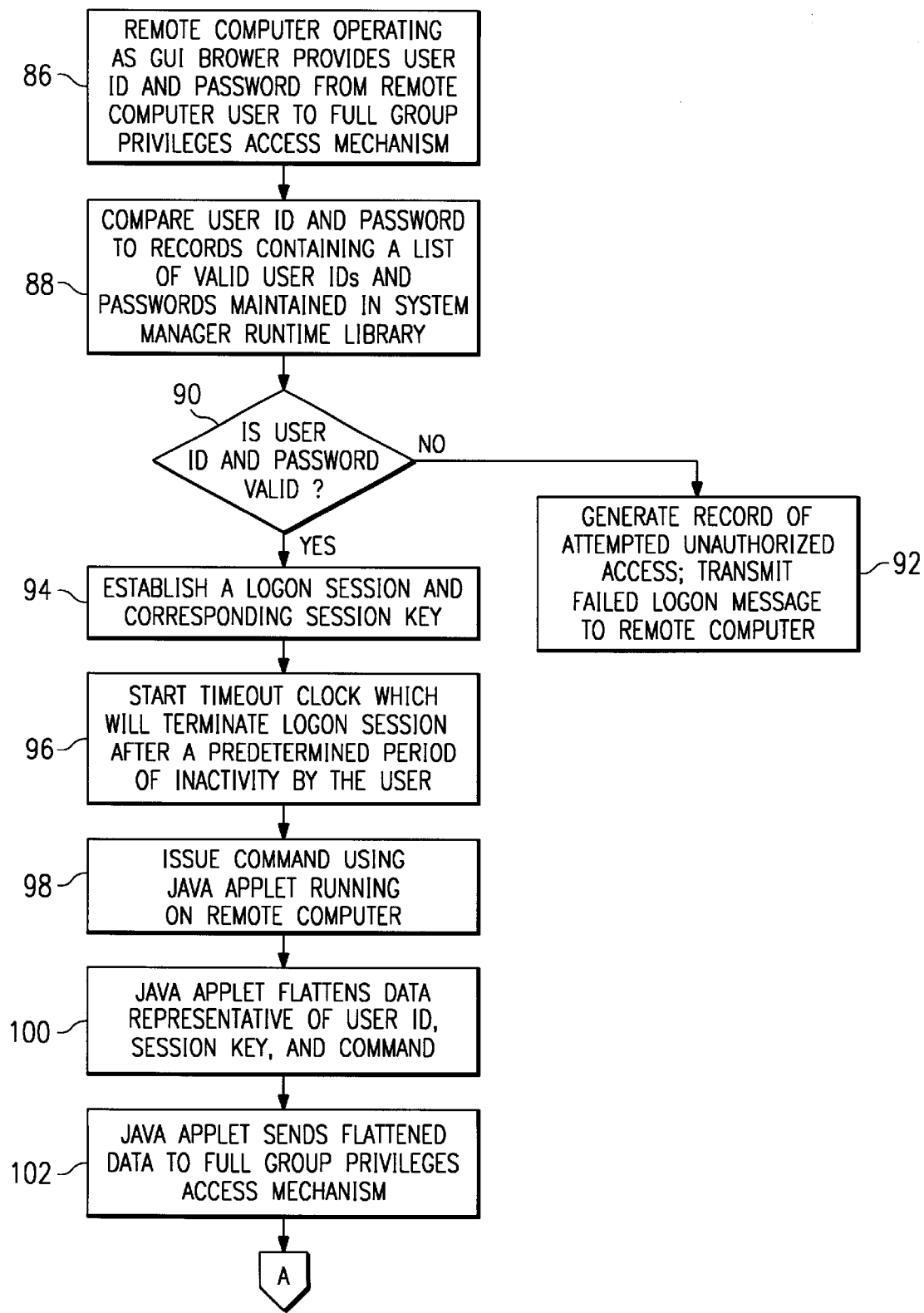

FIGS. 3A–B depict an exemplary process flow for the operation of the Full Group Privileges Access Mechanism, beginning with Block 86. When a user attempts to access the Telecommunications Switch Management System depicted in FIG. 1 via Remote Computer 10, Remote Computer 10 which operates as a GUI Browser provides the user's User ID and Password to System Manager 18, as shown in Block 86. As shown in Block 88, System Manager 18, in conjunction with System Security Manager Client 54 and System Security Manager Sever 58, then access the records containing the list of valid User IDs and Passwords, which records are maintained in the System Manager Runtime Library 19, and compare the user's User ID and Password to the list of valid User IDs and Passwords. As shown in Blocks 90 and 92, if the Full Group Privileges Access Mechanism determines that the user's User ID or Password is not valid, the Full Group Privileges Access Mechanism generates a record of the attempted unauthorized access, and transmits a Failed Logon message to Remote Computer 10, which in turn displays the message to the user.

If on the other hand the Full Group Privileges Access Mechanism determines the user's User ID and Password to be valid, the Full Group Privileges Access Mechanism establishes a logon session and a corresponding session key, as shown in Blocks 90 and 94. In determining whether the user's User ID and Password are valid, the Full Group Privileges Access Mechanism typically would reference the above-described records of authorized User IDs, authorized Passwords, and the expiration date and time for each User ID and Password, which records are maintained in System Manager Runtime Library 19.

As shown in Block 96, if a logon session is established, the Full Group Privileges Access Mechanism starts a timeout clock which will terminate the logon session after a predetermined period of inactivity by the user. Thus, if a user at Remote Computer 10 is logged into the Telecommunications Switch Management System for a certain period of time without making any entries into Remote Computer 10, the system will automatically terminate the user's logon session. This prevents unauthorized users from accessing the system if an authorized user who is logged on leaves Remote Computer 10 without first terminating the logon session.

As shown in Block 98, when the authorized user wishes to access a function or execute a command of the Telecommunications Switch Management System, the user issues a command using Java Applet 22 running on Remote Computer 10. The Java Applet 22 running on Remote Computer 10 then flattens the data representative of the user's User ID, the session key and the issued command, and sends this flattened data to System Manager 18, as shown in Blocks 100 and 102, The Full Group Privileges Access Mechanism then extracts the User ID, the session key and the issued command from the flattened data, and compares this information with the information in the Full Group Privileges Access Mechanism's records relating to User Groups and authorization levels which are maintained in System Manager Runtime Library 19, as shown in Block 104. Based on the user's authorization level and the User Groups of which the user is a member, the Full Group Privileges Access Mechanism determines whether the user is authorized to execute the command or to access the system function which the command accesses. In determining whether the user is authorized to execute the command or access the function, the Full Group Privileges Access Mechanism typically would reference the above-described records of the User Groups of which the user is a member, the User Groups authorized to execute each command and access each function, the user's authorization level, and the minimum authorization level required to execute each available command and access each available function.

As shown in Blocks 106 and 108, if the user is not authorized to execute the command or access the function, the Full Group Privileges Access Mechanism generates a record of the attempted unauthorized access, and sends a message to Remote Computer 10 indicating that the user's attempt to access the Telecommunications Switch Management System has failed. As shown in Blocks 106 and 110, if the user is authorized to execute the command or access the function, System Manager 18 transmits flattened data representative of the issued command to System Management Interface 56. System Management Interface 56 then sends the issued command to the appropriate Server 60 via Command Interpreter 62 and the appropriate Client in System Command Interface 64, as shown in Block 112.

As shown in Block 114, the appropriate Server 60 executes the command and then provides a response to Java Applet 22 running on Remote Computer 10, in the form of a message routed to Remote Computer 10 through System Management Interface 56 and System Manager 18. The Java Applet running on Remote Computer 10 displays a message denoting the response from Server 60 on Remote Computer 10 for the user, as shown in Block 116. Although the applications of Servers 60 may be constructed using any suitable method, they may be constructed using the well known C++ programming language, for example.

The FIG. 1 system also includes a Graphical Shelf Navigator which provides a convenient GUI interface for accessing and implementing the features and functions of the Telecommunications Switch Management System. The Graphical Shelf Navigator enables the user to access and implement the Telecommunications Switch Management System's features and functions simply by making appropriate selections from a series of graphical displays and menus. The user can use the Graphical Shelf Navigator to conveniently and easily access the Telecommunications Switching System 230 for any purpose, such as for the test and reconfiguration of the Telecommunications Switching System 230 or for the monitoring of the Telecommunications Switching System 230's performance and faults.

The Graphical Shelf Navigator operates by prompting the user to select the particular portion of the Telecommunications Switching System 230 the user wishes to access or perform an operation on, and by also prompting the user to select the particular function or command the user wishes to execute on the selected portion of the Telecommunications Switching System 230. The user may implement the desired selections using any appropriate keystrokes on Remote Computer 10. Typically, however, the user implements the desired selections using any type of well known mouse commands, such as by moving the mouse to place a cursor on the portion of the display corresponding to the desired selection, and by then "clicking" the mouse on that portion of the display.

Figure 4:
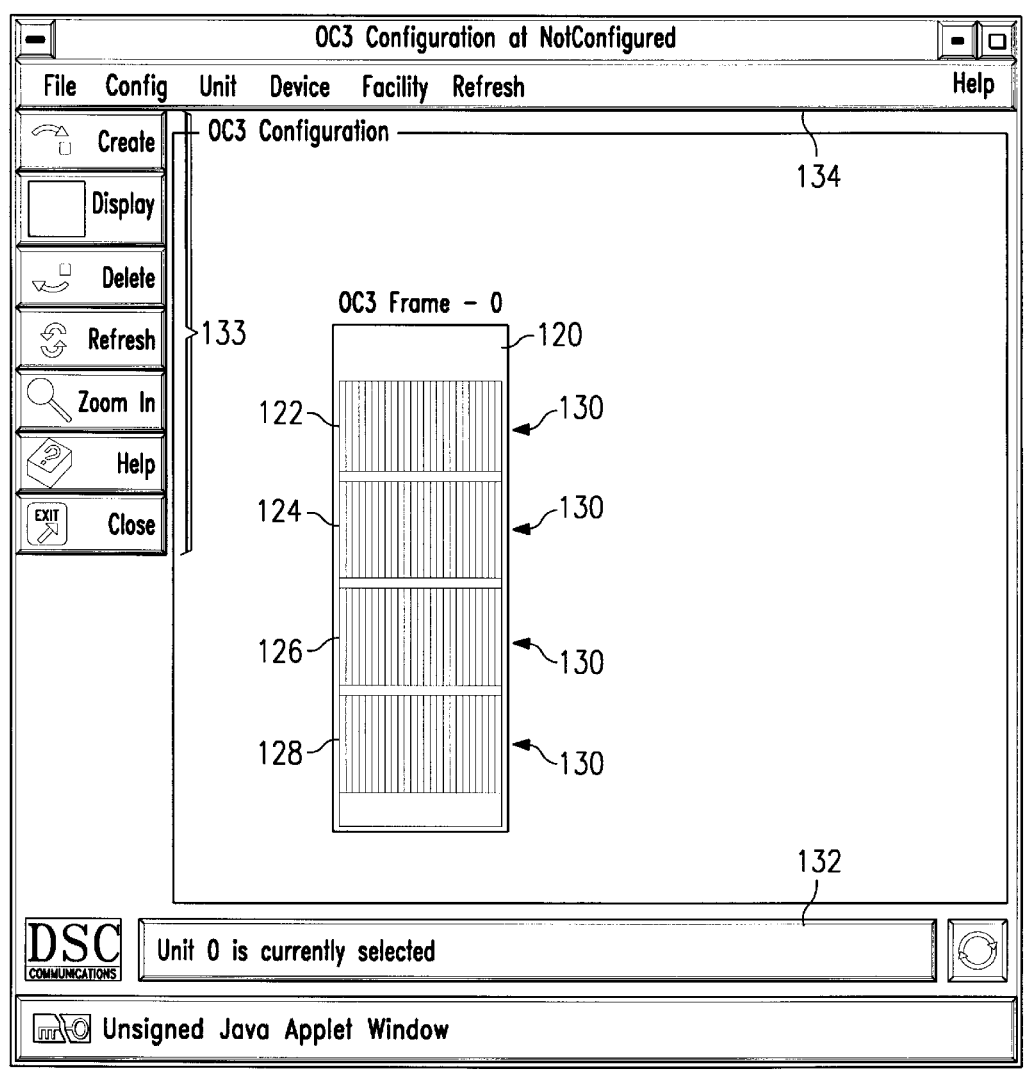
FIG. 4 is an exemplary first display in the series of displays provided by the Graphical Shelf Navigator of the present invention.

FIG. 4 depicts the first of the Graphical Shelf Navigator's series of graphical displays. The graphical display depicted in FIG. 4 represents the cabinet, shelves and application cards (i.e., the printed circuit boards which contain electronic components) which compose the Telecommunications Switching System 230's electronic hardware, as well as the particular shelf of application cards which the user selects Specifically, Cabinet Graphic 120 represents the cabinet which contains the electronic hardware of Telecommunications Switching System 230. Shelf Graphics 122, 124, 126 and 128 represent the shelves within the cabinet which contain the application cards. Application Card Graphics 130 represent the application cards which contain the Telecommunications Switching System 230's electronic components The darker shading of Shelf Graphic 122, and of the Application Card Graphics 130 contained therein, denotes that the user has selected that shelf and those application cards The selection of this shelf is denoted in Status Bar 132; in the particular example depicted in FIG. 4, the selected shelf of application cards is designated as "Unit 0". Thus, Status Bar 132 serves to denote the designation of the particular shelf selected.

Once the user has selected the desired shelf, the user then selects from Icon Bar 133 the function which the user desires to perform on the selected shelf. In the graphical display depicted in FIG. 4, the functions available to be performed on a selected shelf are designated as "Create", "Display", "Delete", "Refresh", "Zoom In", "Help", and "Close". Menu Bar 134 provides the user access to numerous menu functions and/or files related to the Graphical Shelf Navigator, and will be discussed below in additional detail.

Although the example of FIG. 4 depicts four shelves as containing application cards, as a general rule either one, two or three shelves can be empty. Similarly, although the example of FIG. 4 depicts the upper shelf (represented by Shelf Graphic 122) as being selected, the user may select any shelf. The designation of any shelf which has been selected will be denoted in Status Bar 132.

Figure 5:
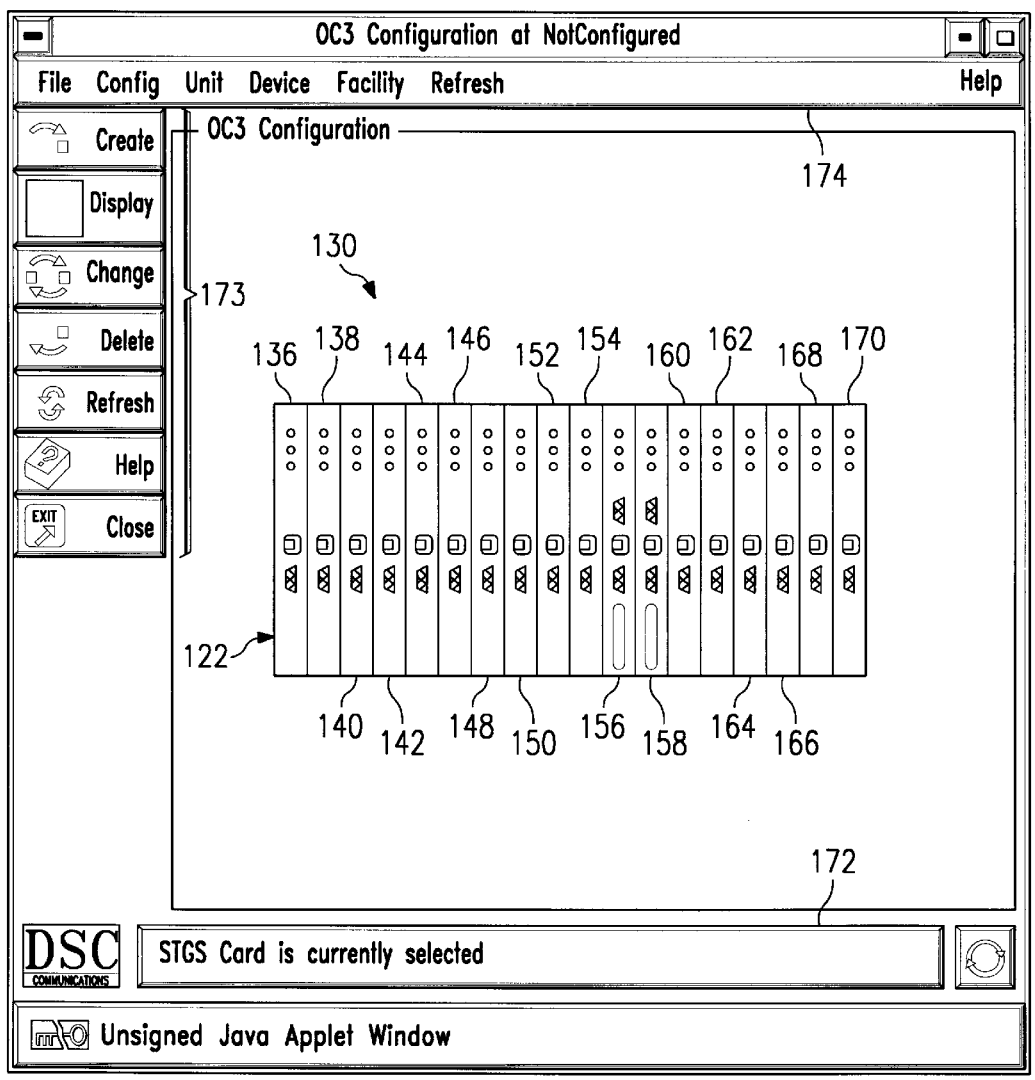
FIG. 5 is an exemplary next display in the series of displays provided by the Graphical Shelf Navigator of the present invention.

FIG. 5 depicts an example of one of the next graphical displays in the Graphical Shelf Navigator's series of graphical displays. The graphical display depicted in FIG. 5 would result if, in the graphical display depicted in FIG. 4, the user selected the function designated by "Zoom In" to be performed on the selected shelf. The graphical display depicted in FIG. 5 represents the shelf of application cards which the user selected in the graphical display depicted in FIG. 4, as well as the particular application card within the shelf which the user selects. Specifically, application Card Graphics 136, 138, 140, 142, 144, 146, 148, 150, 152, 154, 156, 158, 160, 162, 164 and 166 represent the individual application cards located in that shelf; the aggregate of all of these application cards is collectively represented by Application Card Graphics 130. Empty Application Card Slot Graphics 168 and 170 represent empty application card slots located in that shelf, The darker shading of Application Card Graphic 138 denotes that the user has selected that application card. The selection of that application card is denoted in Status Bar 172. In the particular example depicted in FIG. 5, the selected application card is designated as "STGS". Thus, Status Bar 172 serves to denote the designation of the particular application card selected.

Once the user has selected the desired application card, the user then selects from Icon Bar 173 the function which the user desires to perform on the selected application card. In the particular example depicted in FIG. 5, the functions available to be performed on a selected application card are designated as "Create", "Display", "Change", "Delete", "Refresh", "Help", and "Close" Menu Bar 174 provides the user access to numerous menu functions and/or files related to the Graphical Shelf Navigator, and will be discussed below in additional detail.

Although the example of FIG. 5 depicts a shelf having sixteen application cards and two empty application card slots, as a general rule a shelf may contain any number of application card slots and any number of application cards, up to and including the number of application card slots. Similarly, although the example of FIG. 5 depicts the application card represented by Application Card Graphic 138 as being selected, the user may select any application card. The designation of any application card which has been selected will be denoted in Status Bar 172.

Figure 6:
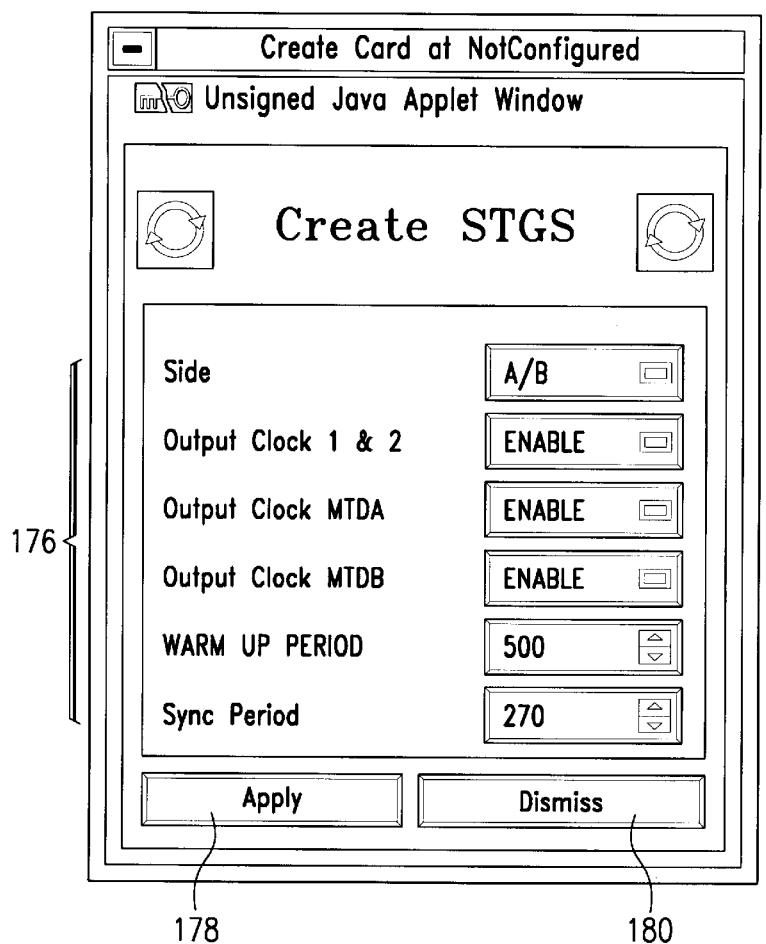
FIG. 6 is an exemplary next and final display in the series of displays provided by the Graphical Shelf Navigator of the present invention.

Once the user utilizes the graphical display depicted in FIG. 5 to select a particular application card and a function to be performed on that application card, the user is presented with the next and final display of the Graphical Shelf Navigator's series of displays, which display enables the user to fully implement the selected function on the selected application card. One example of such a display is depicted in FIG. 6. FIG. 6 depicts such a display in the particular case where, in the graphical display depicted in FIG. 5, the user selects the function which is designated by "Create" to be performed on the application card which is designated by "STGS". In order to implement the function designated by "Create" on the application card designated by "STGS", the user configures each of the parameters provided in Configuration Lines 176 as desired, and then invokes the "Apply" Command 178. If, on the other hand, the user decides to not implement the function designated by "Create" on the application card designated by "STGS", the user invokes the "Dismiss" command 180.

Although FIG. 6 depicts the Graphical Shelf Navigator's display in the particular case where the user has selected the function designated by "Create" to be performed on the application card designated by "STGS", the Graphical Shelf Navigator can provide such a display for every combination of available application cards and available functions. The visual appearance of each display, and the particular Configuration Lines 176 provided in each display, depend on the particular application card and the function selected by the user.

FIG. 7 depicts an exemplary process flow for the operation of the Graphical Shelf Navigator example depicted in FIGS. 4–6. As shown in Block 182, the Graphical Shelf Navigator begins by displaying to the user the graphical display depicted in FIG. 4. While viewing this graphical display, the user utilizes Shelf Graphics 122, 124, 126 and 128 to select the shelf of application cards on which the user desires to perform a function, as shown in Block 184. The user then uses Icon Bar 133 to select the function to be performed on the selected shelf of application cards, as shown in Block 186.

As shown in Block 188, the Graphical Shelf Navigator then changes the display to the graphical display depicted in FIG. 5. While viewing this graphical display, the user then uses Application Card Graphics 130 to select the specific application card on which the user desires to perform a function, as shown in Block 190. As shown in Block 192, the user then utilizes Icon Bar 173 to select the function to be performed on the selected application card. As shown in Block 194, the Graphical Shelf Navigator then changes the display to the display depicted in FIG. 6, As shown in Block 196, the user appropriately configures each of the parameters provided in Configuration Lines 176. Finally, in order to execute the selected function on the selected application card, the user invokes the "Apply" Command 178, as shown in Block 198.

The Graphical Shelf Navigator also provides pull-down menus as an alternative way for a user to access and implement the features and functions of the Telecommunications Switch Management System. A user has the option to use these pull-down menus instead of the above-described series of graphical displays depicted in FIGS. 4 and 5, in order to access and implement any of the features and functions of the Telecommunications Switch Management System.

As with the series of graphical displays described above, the pull-down menus operate by prompting the user to select the particular portion of the Telecommunications Switching System 230 the user wishes to access or perform an operation on, and by also prompting the user to select the particular function or command the user wishes to execute on the selected portion of Telecommunications Switching System 230. The user may implement the desired pull-down menu selections using any appropriate keystrokes on Remote Computer 10, but typically implements these selections using any type of well known mouse commands, such as by moving the mouse to place a cursor on the portion of the pull-down menu corresponding to the desired selection, and by then "clicking" the mouse on that portion of the menu.

Figure 8:
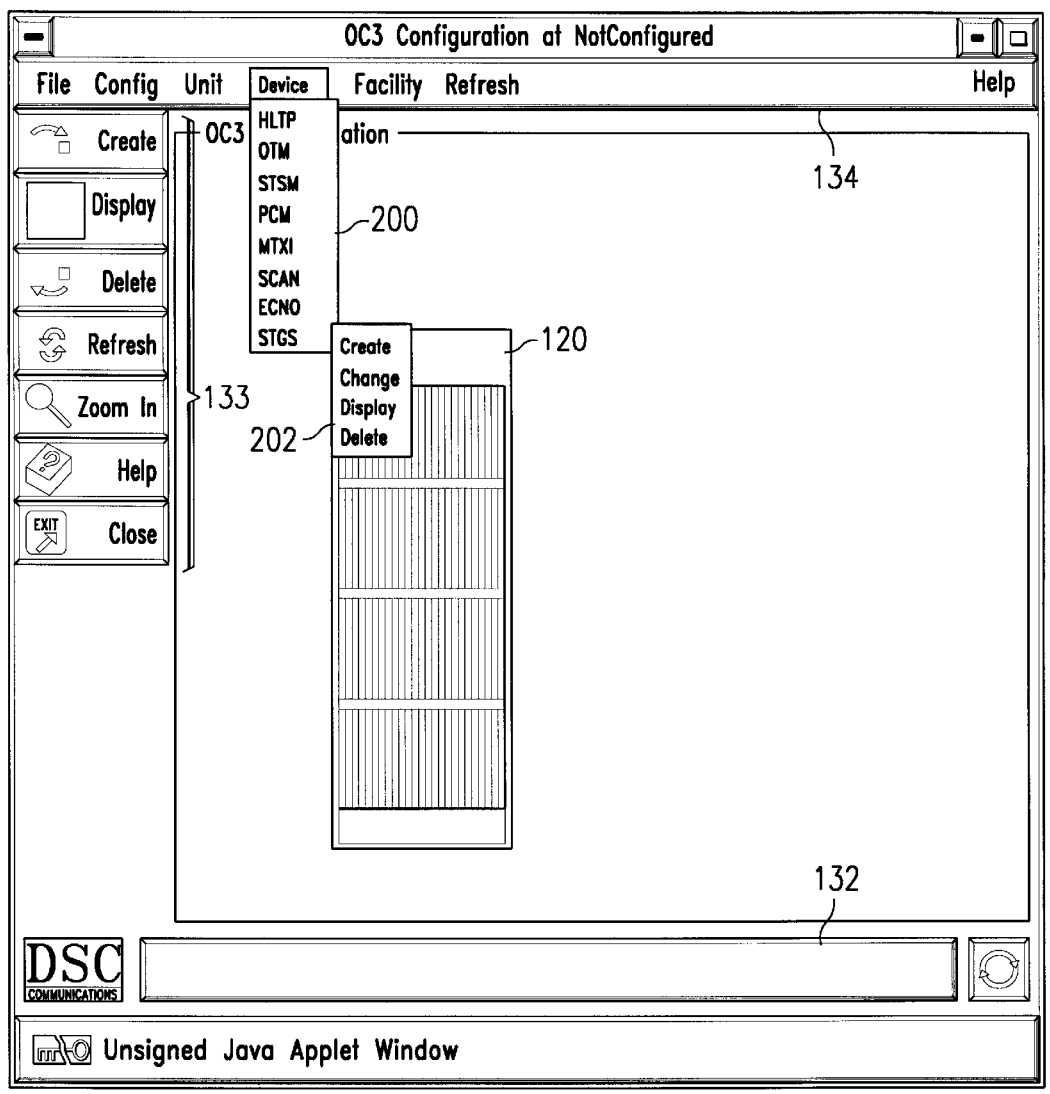
FIG. 8 is an exemplary display of the pull-down menus of the Graphical Shelf Navigator of the present invention.

FIG. 8 depicts the Graphical Shelf Navigator's Pull-Down Menus 200 and 202, which provide an alternative way for a user to implement the selections which can be made using the graphical display depicted in FIG. 4. Although the same Cabinet Graphic 120 and Icon Bar 133 depicted in FIG. 4 also appear in FIG. 8, the Cabinet Graphic 120 and Icon Bar 133 become inactive once the user activates Pull-Down Menus 200 and 202. Once Cabinet Graphic 120 and Icon Bar 133 become inactive, they can no longer be used to select portions of the Telecommunications Switching System 230, or functions to be performed thereon.

The user activates Pull-Down Menu 200 by using Menu Bar 134. In the exemplary Menu Bar 134 depicted in FIG. 8, the available selections are designated "File", "Config", "Unit", "Device", "Facility", "Refresh", and "Help". FIG. 8 depicts the example where the user has selected the "Device" option from Menu Bar 134. Based on the user's selection of the "Device" option, the Graphical Shelf Navigator generates Pull-Down Menu 200, which provides the user with a selection of devices, namely application cards, having the designations "HLTP", "OTM", "STSM", "PCM", "MTXI", "SCAN", "ECHO", and "STGS". The user then selects the desired application card from Pull-Down Menu 200. FIG. 8 depicts the particular example where the user has selected the application card designated by "STGS".

Once the user has selected the desired application card from Pull-Down Menu 200, the Graphical Shelf Navigator then generates Pull-Down Menu 202, which provides the user with a selection of functions which can be performed on the selected application card. In the example of FIG. 8, the functions available are designated by "Create", "Change", "Display", and "Delete" FIG. 8 depicts the example where the user selects the function designated by "Create".

Although FIG. 8 depicts Pull-Down Menu 200 in the particular case where the user has selected the option designated as "Device" from Menu Bar 134, the Graphical Shelf Navigator provides an appropriate pull-down menu for each available option in Menu Bar 134. The appearance of each of those pull-down menus, and the selections provided therein, depend on the option selected from menu bar 134. Similarly, although FIG. 8 depicts Pull-Down Menu 202 in the particular case where the user has selected the application card designated as "STGS" from Pull-Down Menu 200, the Graphical Shelf Navigator provides an appropriate pull-down menu for each available application card appearing in Pull-Down Menu 200. The appearance of each of those pull-down menus, and the selections provided therein, depend on the application card selected from Pull-Down Menu 202.

Figure 9:
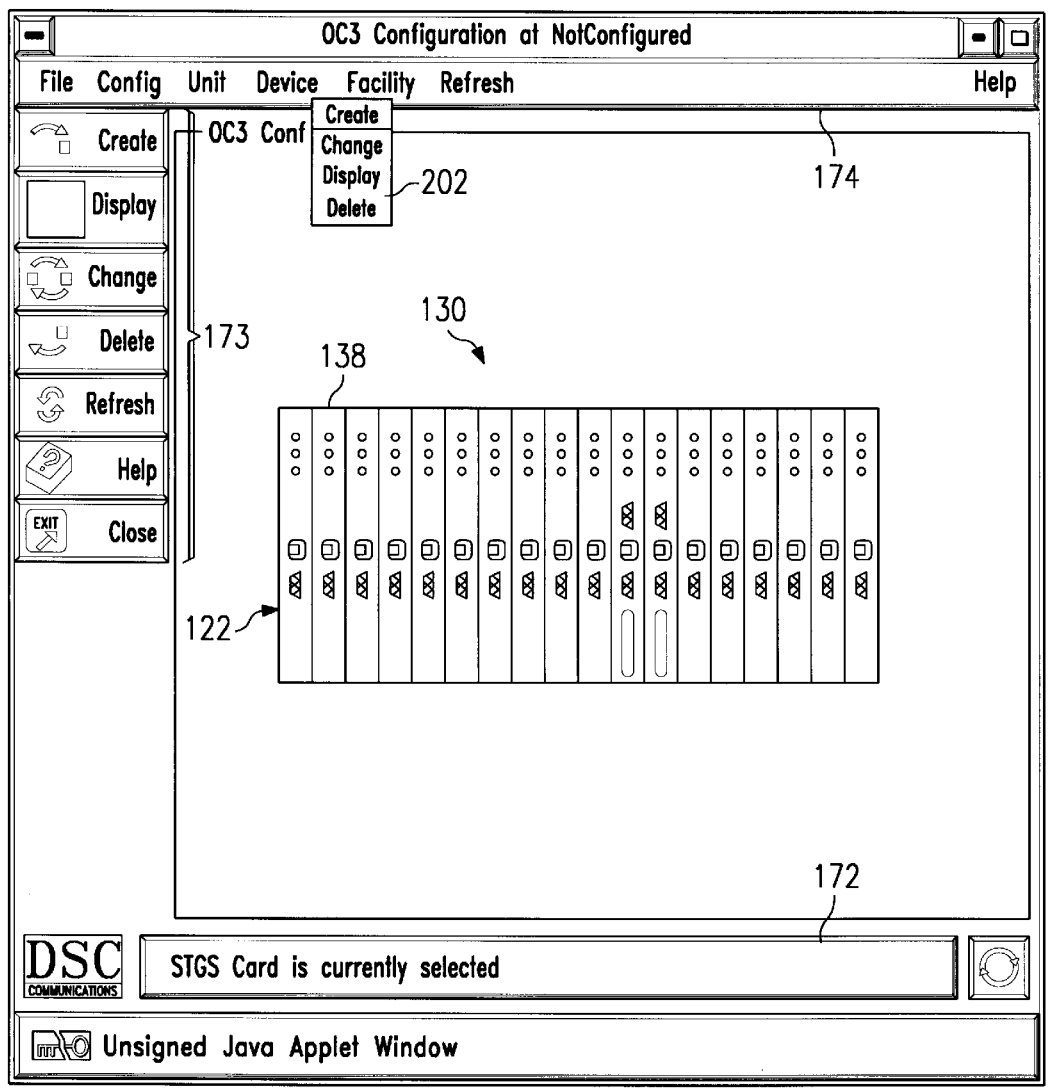
FIG. 9 is another exemplary display of the pull-down menus of the Graphical Shelf Navigator of the present invention

In addition to accessing Pull-Down Menu 202 from Pull-Down Menu 200, a user alternatively can access Pull-Down Menu 202 from the graphical display depicted in FIG. 56 FIG. 9 depicts the same graphical display as is depicted in FIG. 5, which display represents a single shelf of application cards of Telecommunications Switching System 230 In order to access Pull-Down Menu 202 from the display depicted in FIG. 9, the user selects an application card from Shelf Graphic 122. Once the user has selected an application card, the Graphical Shelf Navigator then generates Pull-Down Menu 202, which is the same as the Pull-Down Menu 202 depicted in FIG. 8. As in the example depicted in FIG. 8, the user then selects from the Pull-Down Menu 202 in FIG. 9 a function to be performed on the selected application card. Although FIG. 9 depicts Icon Bar 173, which is also depicted in FIG. 5, Icon Bar 173 becomes inactive once the user activates Pull-Down Menu 202. Once Icon Bar 173 becomes inactive, it cannot be used to select functions to be performed on the selected application card.

In the example depicted in FIG. 9, as in the example of FIG. 5, the darker shading of Application Card Graphic 138 denotes that the user has selected that application card. The selection of that application card is denoted in Status Bar 172. In the particular example depicted in FIG. 9, the selected application card is designated as "STGS". Status Bar 172 denotes the designation of the particular application card selected.

Once the user has utilized Pull Down Menus 200 and 202 to select the desired application card and function, respectively, the Graphical Shelf Navigator then provides the user with the final display which enables the user to fully implement the selected function on the selected application card. This final display is the same final display which the Graphical Shelf Navigator would provide if the user had selected the application card and function using the Graphical Shelf Navigator's series of graphical displays (such as are depicted in FIGS. 4 and 5, for example), rather than Pull-Down Menus 200 and 202.

One example of such a display is depicted in FIG. 6. FIG. 6 depicts such a display in the particular case where, using the pull-down menus depicted in either FIGS. 8 or 9, the user selects the function which is designated by "Create" to be performed on the application card which is designated by "STGS". In order to implement the function designated by "Create" on the application card designated by "STGS", the user configures each of the parameters provided in Configuration Lines 176 as desired, and then invokes the "Apply" Command 178. If, on the other hand, the user decides to not implement the function designated by "Create" on the application card designated by "STGS", the user invokes the "Dismiss" command 180.

Although FIG. 6 depicts the Graphical Shelf Navigator's display in the particular case where the user has used Pull-Down Menus 200 and 202 to select the function designated by "Create" to be performed on the application card designated by "STGS", the Graphical Shelf Navigator provides such a display for every combination of available application cards and available functions. The visual appearance of each display, and the particular Configuration Lines 176 provided in each display, depend on the application card and the function selected by the user.

Figure 10:
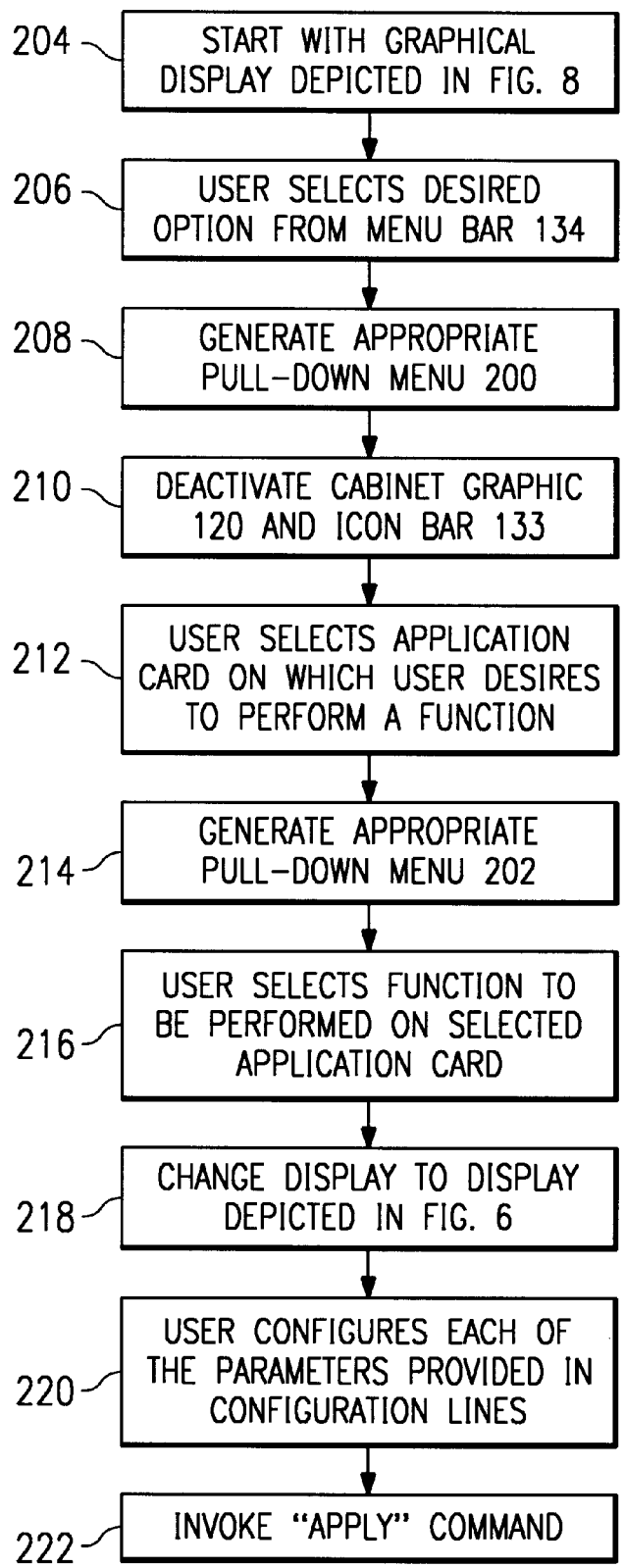
FIG. 10 is an exemplary process flow diagram for the operation of the pull-down menus of the Graphical Shelf Navigator of the present invention

FIG. 10 depicts an exemplary process flow for the operation of the Graphical Shelf Navigator pull-down menu example depicted in FIG. 8. As shown in Block 204, the Graphical Shelf Navigator begins by displaying to the user the graphical display depicted in FIG. 8. The user then selects the desired option from Menu Bar 134. As shown in Blocks 208 and 210, respectively, the Graphical Shelf Navigator then generates the appropriate Pull-Down Menu 200, and also deactivates Cabinet Graphic 120 and Icon Bar 133. Using Pull-Down Menu 200, the user selects the specific application card on which the user desires to perform a function, as shown in Block 212. As shown in Block 214, the Graphical Shelf Navigator then generates the appropriate Pull-Down Menu 202. Using Pull-Down Menu 202, the user then selects the function to be performed on the selected application card, as shown in Block 216.

As shown in Block 218, the Graphical Shelf Navigator then changes the user's display to the display depicted in FIG. 6. As shown in Block 220, the user appropriately configures each of the parameters provided in Configuration Lines 176. Finally, in order to execute the selected function on the selected application card, the user invokes the "Apply" Command 178, as shown in Block 222.

Although the present invention and its advantages have been described in detail, it should be understood that various changes, substitutions and alterations can be made therein without departing from the spirit and scope of the invention as defined by the appended claims.

What is claimed is:

1. A telecommunications switch management system for providing access to a telecommunications switching system, comprising:

a system manager building block in communication with a remote computer:

a system management interface building block in communication with said system manager building block, said system management interface building block having a system command interface building block containing at least one client building block; and at least one server building block in communication with said at least one client building block in said system management interface building block, said at least one server building block being in communication with the telecommunications switching system, wherein said system manager building block provides communication between said remote computer and said system management interface building block, and wherein said system management interface building block provides communication between said system manager building block and said at least one server building block, so that said remote computer is provided access to the telecommunication switching system, said remote computer operable to perform a function on a selected application card within the telecommunication switching system in response to user inputs and in response to the user having an appropriate authorization level associated with the function; and wherein said system manager building block and said system management interface building block conform to a common object request broker architecture (CORBA), and wherein said system manager building block is configured to communicate with said system management interface building block using a CORBA communication protocol.

2. The telecommunications switch management system of claim 1, wherein said at least one client building block in communication with said at least one server building block further comprises:

a system security manager client building block in communication with a system security manager server building block for providing the telecommunications switching system with security functions;

a bearer manager client building block in communication with a bearer manager server building block for providing an ability to perform management functions on the telecommunications switching system;

a fault manager client building block in communication with a fault manager server building block for providing an ability to review faults which have occurred in the telecommunications switching system;

a test manager client building block in communication with a test manager server building block for providing an ability to perform tests on the telecommunications switching system;

a performance manager client building block in communication with a performance manager server building block for providing an ability to review the performance of the telecommunications switching system; and a configuration management client building block in communication with a configuration management server building block for providing an ability to configure attributes of the telecommunications switching system.

3. The telecommunications switch management system of claim 1, wherein said system management interface building block further comprises a command interpreter building block in communication with said system manager building block, and in communication with said system command interface building block containing said at least one client building block, wherein said system manager building block provides communication between said remote computer and said command interpreter building block, and wherein said command interpreter building block provides communication between said system manager building block and said system command interface building block containing said at least one client building block.

4. The telecommunications switch management system of claim 3, wherein said at least one client building block in communication with said at least one server building block further comprises a system security manager client building block in communication with a system security manager server building block for providing the telecommunications switching system with security functions.

5. The telecommunications switch management system of claim 3, wherein said at least one client building block in communication with said at least one server building block further comprises a bearer manager client building block in communication with a bearer manager server building block for providing an ability to perform management functions on the telecommunications switching system.

6. The telecommunications switch management system of claim 3, wherein said at least one client building block in communication with said at least one server building block further comprises a fault manager client building block in communication with a fault manager server building block for providing an ability to review faults which have occurred in the telecommunications switching system.

7. The telecommunications switch management system of claim 3, wherein said at least one client building block in communication with said at least one server building block further comprises a test manager client building block in communication with a test manager server building block for providing an ability to perform tests on the telecommunications switching system.

8. The telecommunications switch management system of claim 3, wherein said at least one client building block in communication with said at least one server building block further comprises a performance manager client building block in communication with a performance manager server building block for providing an ability to review the performance of the telecommunications switching system.

9. The telecommunications switch management system of claim 3, wherein said at least one client building block in communication with said at least one server building block further comprises a configuration management client building block in communication with a configuration management server building block for providing an ability to configure attributes of the telecommunications switching system.

10. The telecommunications switch management system of claim 1, wherein said remote computer is configured to communicate with said system manager building block using an internet inter-ORB protocol (IIOP) communications protocol.

11. The telecommunications switch management system of claim 1, wherein said remote computer is configured to communicate with said system manager building block using a hypertext transport protocol (HTTP) communications protocol.

12. The telecommunications switch management system of claim 3, wherein said system manager building block and said command interpreter building block conform to a common object request broker architecture (CORBA), and wherein said system manager building block communicates with said command interpreter building block using a CORBA communications protocol.

13. The telecommunications switch management system of claim 3, wherein said command interpreter building block is configured to communicate with said system command interface building block containing said at least one said client building block using a library application programming interface (API) communications protocol.

14. The telecommunications switch management system of claim 1, wherein said at least one client building block and said at least one server building block conform to a common object request broker architecture (COBRA), and wherein said at least one client building block is configured to communicate with said at least one server building block using a CORBA communications protocol.

15. A telecommunications switch management system for providing access to a telecommunications switching system, comprising:

a system manager building block having a CORBA architecture and being in communication with a remote computer;

a command interpreter building block having a CORBA architecture and being in communication with said system manager building block using a CORBA communications protocol;

a system command interface building block in communication with said command interpreter building block using a library application programming interface (API) communications protocol, said system command interface building block having a system security manager client building block having a CORBA architecture, a bearer manager client building block having a CORBA architecture, a fault manager client building block having a CORBA architecture, a test manager client building block having a CORBA architecture, a performance manager client building block having a CORBA architecture, and a configuration management client building block having a CORBA architecture;

a system security manager server building block having a CORBA architecture and being in communication with said system security manager client building block using a CORBA communications protocol, for providing the telecommunications switching system with security functions;

a bearer manager server building block having a CORBA architecture and being in communication with said bearer manager client building block using a CORBA communications protocol, for providing an ability to perform management functions on the telecommunications switching system;

a fault manager server building block having a CORBA architecture and being in communication with said fault manager client building block using a CORBA communications protocol, for providing an ability to review faults which have occurred in the telecommunications switching system;

a test manager server building block having a CORBA architecture and being in communication with said test manager client building block using a CORBA communications protocol, for providing an ability to perform tests on the telecommunications switching system;

a performance manager server building block having a CORBA architecture and being in communication with said performance manager client building block using a CORBA communications protocol, for providing an ability to review the performance of the telecommunications switching system; and a configuration management server building block having a CORBA architecture and being in communication with said configuration management client building block using a CORBA communications protocol, for providing an ability to configure attributes of the telecommunications switching system, said server building blocks being in communication with the telecommunications switching system, wherein said system manager building block provides communication between said remote computer and said command interpreter building block, wherein said command interpreter building block provides communication between said system manager building block and said system command interface building block having said client building blocks, and wherein said system command interface building block having said client building blocks provides communication between said command interpreter building block and said server building blocks, so that said remote computer is provided access to the telecommunications switching system, said remote computer operable to perform a function on a selected application card within the telecommunications switching system in response to user inputs and in response to the user having an appropriate authorization level associated with the function.

16. The telecommunications switch management system of claim 15, wherein said remote computer is configured to communicate with said system manager building block using an internet inter-ORB protocol (IIOP) communications protocol.

17. The telecommunications switch management system of claim 15, wherein said remote computer is configured to communicate with said system manager building block using a hypertext transport protocol (HTTP) communications protocol.

* * * * *